(12) United States Patent
Nishina et al.

(10) Patent No.: US 10,031,866 B2
(45) Date of Patent: Jul. 24, 2018

(54) INFORMATION PROCESSING SYSTEM, INFORMATION PROCESSING DEVICE, INFORMATION PROCESSING METHOD, PROGRAM AND INFORMATION STORAGE MEDIUM FOR SETTING DOWNLOAD PERMISSIONS OR SETTINGS

(71) Applicant: SONY COMPUTER ENTERTAINMENT INC., Tokyo (JP)

(72) Inventors: Eiichi Nishina, Tokyo (JP); Shohei Konno, Tokyo (JP); Hiroshi Tamate, Tokyo (JP); Keisuke Ichikawa, Kanagawa (JP); Kazuhiro Suzuki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 95 days.

(21) Appl. No.: 14/416,853

(22) PCT Filed: Aug. 6, 2013

(86) PCT No.: PCT/JP2013/071224
§ 371 (c)(1),
(2) Date: Jan. 23, 2015

(87) PCT Pub. No.: WO2014/024869
PCT Pub. Date: Feb. 13, 2014

(65) Prior Publication Data
US 2015/0207730 A1    Jul. 23, 2015

(30) Foreign Application Priority Data

Aug. 10, 2012 (JP) .................................. 2012-178791
Aug. 10, 2012 (JP) .................................. 2012-178792

(51) Int. Cl.
*G06F 15/16* (2006.01)
*G06F 13/00* (2006.01)
(Continued)

(52) U.S. Cl.
CPC .............. *G06F 13/00* (2013.01); *A63F 13/30* (2014.09); *A63F 13/45* (2014.09); *A63F 13/70* (2014.09);
(Continued)

(58) Field of Classification Search
CPC ....... H04L 67/34; G06F 8/65; H04M 1/72525
(Continued)

(56) References Cited

U.S. PATENT DOCUMENTS 9,264,522 B1 * 2/2016 Reeves .................. H04L 69/24
2005/0209921 A1 * 9/2005 Roberts ................. G06Q 30/02
705/14.13

(Continued)

FOREIGN PATENT DOCUMENTS

JP    2001-99663    4/2001
JP    2003-244241   8/2003
(Continued)

OTHER PUBLICATIONS

Japanese Notification of Reason for Refusal dated Jul. 21, 2015 from corresponding Application No. 2012-178792.
(Continued)

*Primary Examiner* — Hieu Hoang
(74) *Attorney, Agent, or Firm* — Katten Muchin Rosenman LLP

(57) ABSTRACT

It is made possible for a user to set whether to download data used by a program without waiting for the acceptance of a download permission or download the data in response to the acceptance of the download permission via a screen that allows for making the setting for a plurality of programs. An
(Continued)

input/output control section (90) accepts, from the user, a setting as to whether to select an automatic download state or a manual download state via a screen that allows for doing so for a plurality of programs. If the setting of selecting the automatic download state is accepted, an item management section (96) downloads the data from a server without waiting for the acceptance of the download permission from the user when a predetermined condition is satisfied. If the setting of selecting the manual download state is accepted, the item management section (96) downloads the data from the server in response to the acceptance of the download permission from the user when the predetermined condition is satisfied.

4 Claims, 15 Drawing Sheets

(51) Int. Cl.
   *A63F 13/45* (2014.01)
   *A63F 13/71* (2014.01)
   *A63F 13/79* (2014.01)
   *H04L 12/771* (2013.01)
   *A63F 13/30* (2014.01)
   *A63F 13/70* (2014.01)
   *H04L 29/08* (2006.01)
   *H04L 29/06* (2006.01)

(52) U.S. Cl.
   CPC .............. *A63F 13/71* (2014.09); *A63F 13/79* (2014.09); *H04L 45/563* (2013.01); *H04L 67/16* (2013.01); *H04L 67/18* (2013.01); *H04L 67/38* (2013.01); *A63F 2300/552* (2013.01)

(58) Field of Classification Search
   USPC .................................................. 709/217, 220
   See application file for complete search history.

(56) References Cited

U.S. PATENT DOCUMENTS

| | | | | |
|---|---|---|---|---|
| 2006/0004770 | A1* | 1/2006 | Nakano | H04L 67/1095 |
| 2007/0097929 | A1* | 5/2007 | Dunko | G06F 17/3087 |
| | | | | 370/338 |
| 2007/0299737 | A1* | 12/2007 | Plastina | G06Q 30/0207 |
| | | | | 705/14.1 |
| 2008/0115226 | A1* | 5/2008 | Welingkar | H04W 4/00 |
| | | | | 726/28 |
| 2011/0010719 | A1* | 1/2011 | Watanabe | G06F 11/3644 |
| | | | | 718/102 |
| 2011/0252114 | A1* | 10/2011 | Okuyama | G06F 8/60 |
| | | | | 709/217 |
| 2012/0011027 | A1* | 1/2012 | Okuyama | G06F 9/445 |
| | | | | 705/26.41 |
| 2013/0067599 | A1* | 3/2013 | Raje | G06F 8/65 |
| | | | | 726/29 |
| 2013/0122934 | A1* | 5/2013 | Branch | H04W 4/02 |
| | | | | 455/456.3 |

FOREIGN PATENT DOCUMENTS

| | | |
|---|---|---|
| JP | 2008-040737 A | 2/2008 |
| JP | 2008-90369 | 4/2008 |
| JP | 2011-018135 A | 1/2011 |
| WO | 2007/105274 | 9/2007 |
| WO | 2008/114491 | 9/2008 |
| WO | 2010/073530 A1 | 7/2010 |
| WO | 2012/099148 | 7/2012 |
| WO | 2012/102289 A1 | 8/2012 |

OTHER PUBLICATIONS

Translation of International Preliminary Report on Patentability dated Feb. 10, 2015 from corresponding Application No. PCT/JP2013/071224.
Japanese Notification of Reason for Refusal dated Dec. 8, 2015 from corresponding Application No. 2012-178792.
Japanese Notification of Reason for Refusal dated Apr. 21, 2015 from corresponding Application No. 2012-178792.
Pawapuro group, Jikkyou Pawahuru Puro Yakyu 15 [Live Powerful Pro Basketball 15], Weekly Famitsu, Japan, Enterbrain, Inc., Sep. 5, 2008, 23(36), pp. 140-145.
Suomi Matsuzaki, Unreal tournament 3, Weekly Famitsu, Japan, Enterbrain, Inc., Oct. 31, 2008, 23(44), pp. 150-151.
International Search Report dated Oct. 29, 2013, from the corresponding PCT/JP2013/071224.
Pawapuro Han, Jikkyo Powerful Pro Yakyu 15, Shukan Fami Tsu, Japan, Enterbrain, Inc., Sep. 5, 2008 (Sep. 5, 2008), vol. 23, No. 36, pp. 140 to 145.
Suomi Matsuzaki, Unreal Tournament 3, Shukan Fami Tsu, Japan, Enterbrain, Inc. Oct. 31, 2008 (Oct. 31, 2008), vol. 23, No. 44 pp. 150 to 151.
Japanese Decision of Refusal dated Jun. 30, 2015 from corresponding Application No. 2012-178791.

* cited by examiner

F I G . 1 2
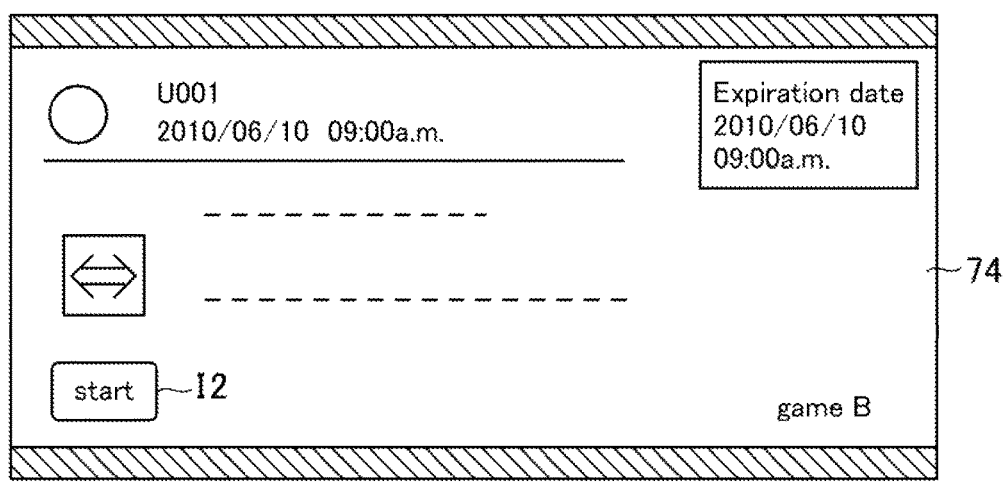

FIG.14

| POSITION COORDINATES | DATE AND TIME |
|---|---|
| (X01,Y01) | 2010/6/30 12:00 |
| (X02,Y02) | 2010/6/30 12:30 |
| (X03,Y03) | 2010/6/30 13:00 |
| (X04,Y04) | 2010/6/30 14:00 |
| (X05,Y05) | 2010/6/30 14:30 |

FIG.15

| TITLE ID | LEVEL | TIME PLAYED | DATE AND TIME LAST PLAYED |
|---|---|---|---|
| T001 | 1 | 18h | 2010/6/25 13:15 |
| T003 | 4 | 110h | 2010/6/25 15:45 |
| T024 | 2 | 52h | 2010/7/1 9:23 |
| T013 | 3 | 61h | 2010/7/2 19:34 |
| T002 | 1 | 3h | 2010/6/23 13:08 |

FIG.16

| AREA ID | TITLE ID | ITEM ID | USER ID | EXPIRATION DATE |
|---|---|---|---|---|
| 010010··· | T003 | I001 | U001 | 2011/12/10 7:00 |
| 010010··· | T024 | I002 | U001 | 2011/12/10 9:00 |
| | | | | |

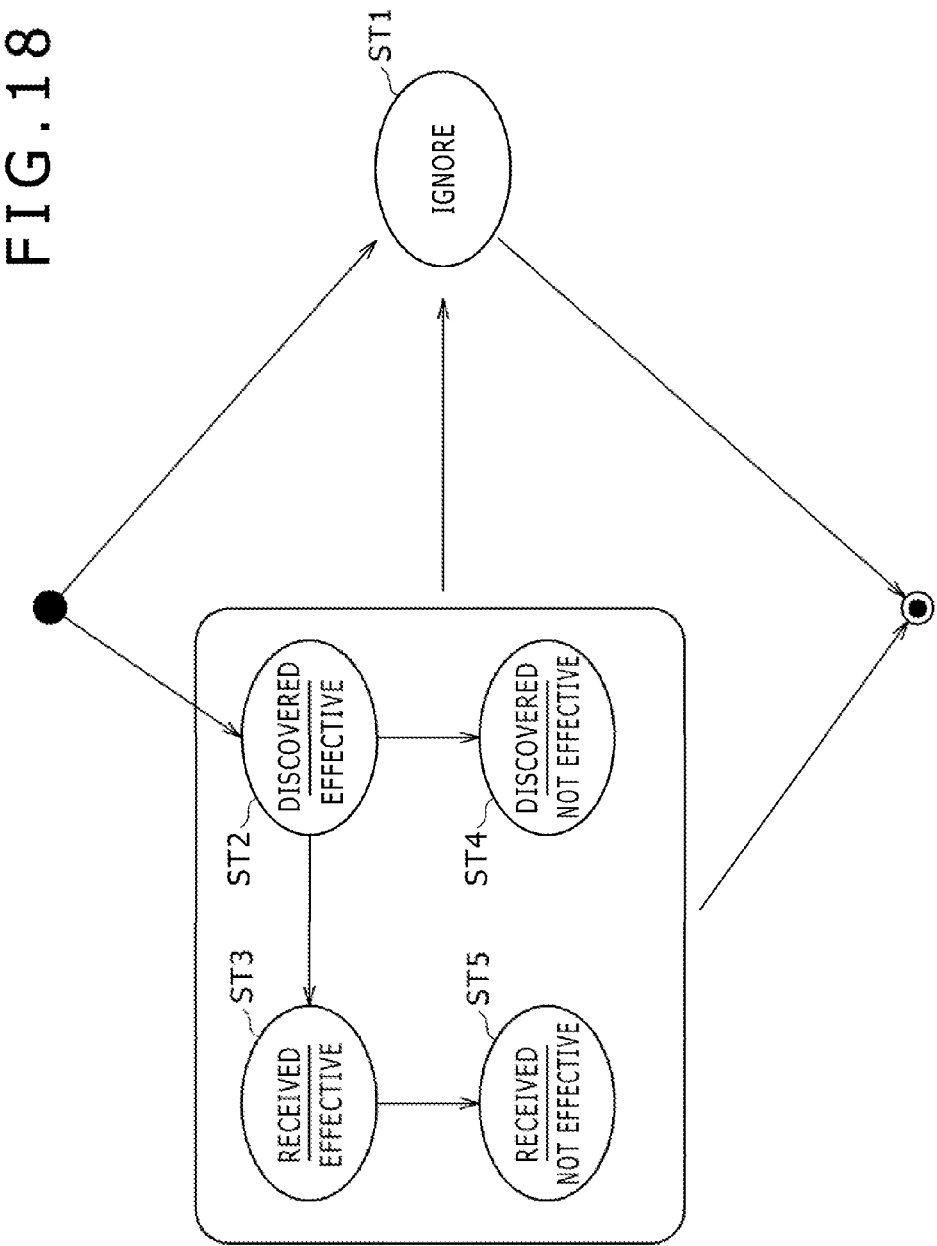

INFORMATION PROCESSING SYSTEM, INFORMATION PROCESSING DEVICE, INFORMATION PROCESSING METHOD, PROGRAM AND INFORMATION STORAGE MEDIUM FOR SETTING DOWNLOAD PERMISSIONS OR SETTINGS

TECHNICAL FIELD

The present invention relates to an information processing system, information processor, information processing method, program, and information storage medium.

BACKGROUND ART

Positioning means such as GPS is now pervasive, and have found their ways into mobile phones and portable game terminals in recent years in addition to car navigation systems. Such positioning means is expected to find application in a wide variety of devices in the future.

SUMMARY

Technical Problems

When positioning means such as GPS is incorporated in a portable game terminal, it is possible to provide, to a user who enjoys playing a game on the portable game terminal, a function of, for example, allowing an item associated with the position of the portable game terminal to be acquired.

At this time, it is probable that, if the user satisfies a condition for acquiring an item associated with the game usually played by him or her, the user is notified thereof first, and that the item is downloaded from a server in response to the acceptance of a download permission from the user. However, this requires the user to permit a download each time an item is made available for acquisition, which is troublesome. On the other hand, if the user satisfies a condition for acquiring an item associated with the game which is not played so much by him or her, and if the item is downloaded from the server without waiting for the acceptance of a download permission from the user, the storage capacity of the portable game terminal may be filled up.

Here, it would be convenient if the user could set whether to download data used by a program without waiting for the acceptance of a download permission or download the data in response to the acceptance of the download permission. Further, if a screen is provided to the user to make the setting for a plurality of programs, the user can make the setting for the plurality of programs via the screen, thus providing improved ease of use.

Further, if a predetermined condition about an item is satisfied, and if the user is notified that the item is available, and then the item whose availability has been notified is downloaded from the server and stored in the portable game terminal, the storage capacity may be filled up because, for example, of a number of downloaded items. A possible solution to this would be to delete, from the portable game terminal, those items that have been used by the game program.

In this case, however, if an attempt is made, for example, to control whether or not to download an item from the server based on whether or not that item is stored in the portable game terminal, the user may be notified again that an item that has been downloaded, used by the game program, and then deleted is available again for acquisition when the user satisfies the condition for acquiring the item later. As a result, it is likely that the item whose availability has been notified may be downloaded from the server.

It should be noted that this is not limited to items but is true for data in general used by game programs executed by a portable game terminal. Further, this is true not only for data used by game programs in game systems such as portable game terminals adapted to execute game programs but also for data used by programs in information processing systems in general adapted to execute ordinary programs.

The present invention has been made in light of the foregoing, and it is an object of the present invention to allow a user to set whether to download data used by a program without waiting for the acceptance of a download permission or download the data in response to the acceptance of the download permission via a screen that allows for making the setting for a plurality of programs.

Further, it is another object of the present invention to ensure that a user is not notified of the availability of data whose availability has been notified and which has already been used by a program even if a condition for making the data available is satisfied.

Solution to Problems

In order to solve the above problem, an information processing system according to the present invention includes acceptance means and downloading means. The acceptance means accepts, from a user, a setting as to whether to download data used by a program without waiting for the acceptance of a download permission or download the data in response to the acceptance of the download permission via a screen that allows for making the setting for a plurality of programs. The downloading means downloads the data from a server without waiting for the acceptance of the download permission from the user if the setting of downloading the data used by the program without waiting for the acceptance of the download permission is accepted, and if a predetermined condition is satisfied for the data used by the program. The downloading means downloads the data from the server in response to the acceptance of the download permission from the user if the setting of downloading the data used by the program in response to the acceptance of the download permission is accepted, and if the predetermined condition is satisfied for the data used by the program.

Further, an information processor according to the present invention includes an acceptance section, a determination section, and a downloading section. The acceptance section accepts, from a user, a setting as to whether or not to download data used by a program without waiting for the acceptance of a download permission via a screen that allows for making the setting for a plurality of programs. The determination section determines, based on the setting, whether to download the data from a server without waiting for the acceptance of the download permission from the user or download the data from the server in response to the acceptance of the download permission from the user if a predetermined condition is satisfied for the data used by the program. The downloading section performs, in accordance with the result of determination made by the determination section, a process of downloading the data from a server without waiting for the acceptance of the download permission from the user or a process of downloading the data from the server in response to the acceptance of the download permission from the user.

Still further, another information processor according to the present invention includes an acceptance section, a determination section, and a downloading section. The acceptance section accepts, from a user, a setting as to whether or not to download data used by a program in response to the acceptance of a download permission via a screen that allows for making the setting for a plurality of programs. The determination section determines, based on the setting, whether to download the data from a server without waiting for the acceptance of the download permission from the user or download the data from the server in response to the acceptance of the download permission from the user if a predetermined condition is satisfied for the data used by the program. The downloading section performs, in accordance with the result of determination made by the determination section, a process of downloading the data from the server without waiting for the acceptance of the download permission from the user or a process of downloading the data from the server in response to the acceptance of the download permission from the user.

Still further, an information processing method according to the present invention includes an acceptance step and a downloading step. The acceptance step accepts, from a user, a setting as to whether to download data used by a program without waiting for the acceptance of a download permission or download the data in response to the acceptance of the download permission via a screen that allows for making the setting for a plurality of programs. The downloading step downloads the data from a server without waiting for the acceptance of the download permission from the user if the setting of downloading the data used by the program without waiting for the acceptance of the download permission is accepted, and if a predetermined condition is satisfied for the data used by the program. The downloading step downloads the data from the server in response to the acceptance of the download permission from the user if the setting of downloading the data used by the program in response to the acceptance of the download permission is accepted, and if the predetermined condition is satisfied for the data used by the program.

Still further, a program according to the present invention causes a computer to function as acceptance means and downloading means. The acceptance means accepts, from a user, a setting as to whether to download data used by a program without waiting for the acceptance of a download permission or download the data in response to the acceptance of the download permission via a screen that allows for making the setting for a plurality of programs. The downloading means downloads the data from a server without waiting for the acceptance of the download permission from the user if the setting of downloading the data used by the program without waiting for the acceptance of the download permission is accepted, and if a predetermined condition is satisfied for the data used by the program. The downloading means downloads the data from the server in response to the acceptance of the download permission from the user if the setting of downloading the data used by the program in response to the acceptance of the download permission is accepted, and if the predetermined condition is satisfied for the data used by the program.

Still further, an information storage medium according to the present invention is a computer-readable information storage medium storing a program. The program causes a computer to function as acceptance means and downloading means. The acceptance means accepts, from a user, a setting as to whether to download data used by a program without waiting for the acceptance of a download permission or download the data in response to the acceptance of the download permission via a screen that allows for making the setting for a plurality of programs. The downloading means downloads the data from a server without waiting for the acceptance of the download permission from the user if the setting of downloading the data used by the program without waiting for the acceptance of the download permission is accepted, and if a predetermined condition is satisfied for the data used by the program. The downloading means downloads the data from the server in response to the acceptance of the download permission from the user if the setting of downloading the data used by the program in response to the acceptance of the download permission is accepted, and if the predetermined condition is satisfied for the data used by the program.

In one mode of the present invention, the screen allows for making the setting for a program that is not installed in the information processing system.

Still further, another information processing system according to the present invention includes notification means, means for storing identification information used to identify data whose availability is notified in identification information storage means, reception means, and control means. The notification means notifies a user that the data used by a program is available. The reception means receives the data whose availability is notified. The control means executes control so that the notification means does not notify the user that data is available if the data is identified by the identification information stored in the identification information storage means and if a condition for making the data available is satisfied after the data has been used by the program.

Still further, another information processing method according to the present invention includes a notification step, a step of storing identification information used to identify data whose availability is notified in identification information storage means, a reception step, and a control step. The notification step notifies a user that data used by a program is available. The reception step receives the data whose availability is notified. The control step executes control so that the notification means does not notify the user that data is available if the data is identified by the identification information stored in the identification information storage means and if a condition for making the data available is satisfied after the data has been used by the program.

Still further, another program according to the present invention causes a computer to function as notification means, means for storing identification information used to identify data whose availability is notified in identification information storage means, reception means, and control means. The notification means notifies a user that data used by a program is available. The reception means receives the data whose availability is notified. The control means executes control so that the notification means does not notify the user that data is available if the data is identified by the identification information stored in the identification information storage means and if a condition for making the data available is satisfied after the data has been used by the program.

Still further, another information storage medium according to the present invention is a computer-readable information storage medium storing a program. The program causes a computer to function as notification means, means for storing identification information used to identify data whose availability is notified in identification information storage means, reception means, and control means. The notification means notifies a user that data used by a program is available. The reception means receives the data whose availability is notified. The control means executes control so that the notification means does not notify the user that data is available if the data is identified by the identification information stored in the identification information storage means and if a condition for making the data available is satisfied after the data has been used by the program.

In one mode of the present invention, the information processing system further includes data storage means and data deletion means. The data storage means stores received data. The data deletion means deletes the data from the data storage means when the data is used by the program.

Further, in another mode of the present invention, the information processing system still further includes identification information deletion means for deleting the other identification information from the identification information storage means if the number of pieces of identification information stored in the identification information storage means exceeds a preset upper limit when new identification information is stored in the identification information storage means.

Further, in a further mode of the present invention, the identification information deletion means deletes the piece of identification information that was stored in the identification information storage means at the earliest time.

BRIEF DESCRIPTION OF DRAWINGS

FIG. 12 is a diagram illustrating an example of a detailed item image.

FIG. 14 is a diagram schematically illustrating the contents of a position coordinate storage section.

FIG. 15 is a diagram schematically illustrating the contents of a game results storage section.

FIG. 16 is a diagram illustrating an example of gift data.

FIG. 18 is a diagram conceptually illustrating an example of state transitions of the received gift data.

DESCRIPTION OF EMBODIMENT

A detailed description will be given below of an embodiment of the present invention based on the accompanying drawings.

Figure 1:
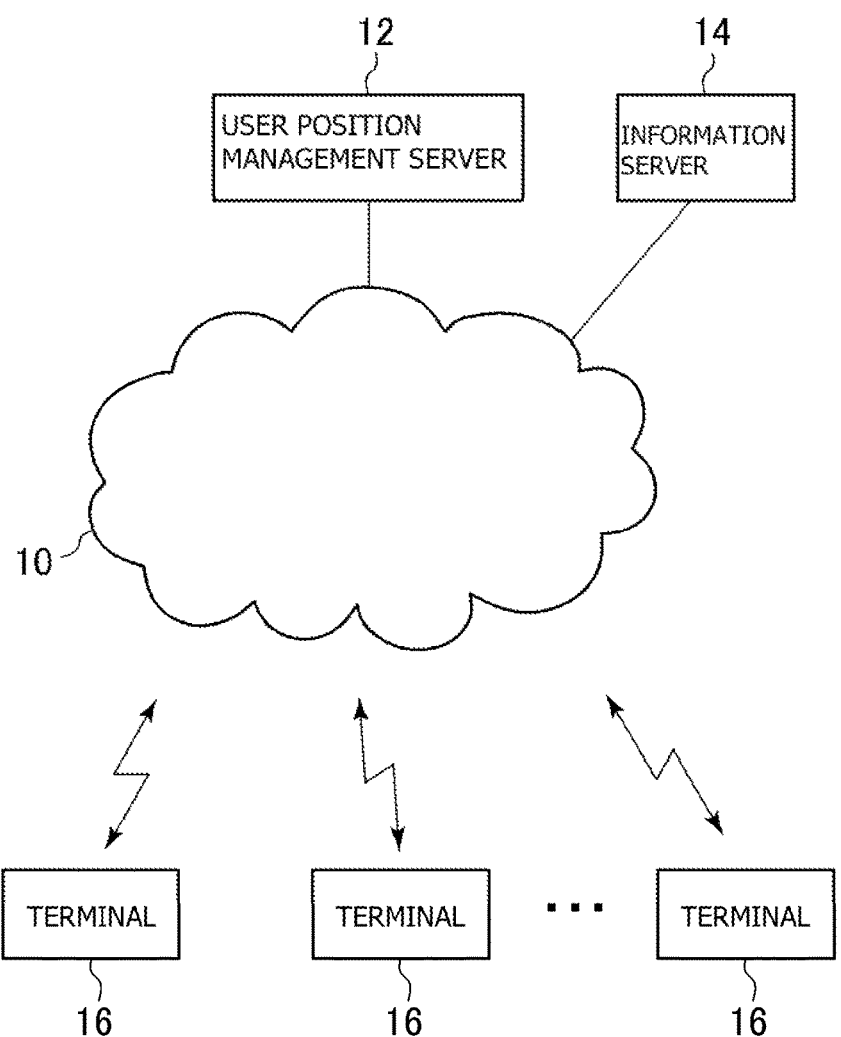
FIG. 1 is an overall configuration diagram of an information processing system according to an embodiment of the present invention.

FIG. 1 is an overall configuration diagram of an information processing system according to an embodiment of the present invention. As illustrated in FIG. 1, a user position management server 12, an information server 14, and a plurality of user terminals 16 are connected to a computer network 10 such as the Internet in this information processing system.

Each of the user position management server 12 and the information server 14 primarily includes a known server computer. The server computer includes, for example, a control section, a storage section, and a communication section. The control section includes a program-controlled device such as CPU that operates in accordance with a program installed in the server. The storage section includes, for example, storage elements such as ROM and RAM and a hard-disk drive. The communication section includes, for example, a network board.

Figure 2:
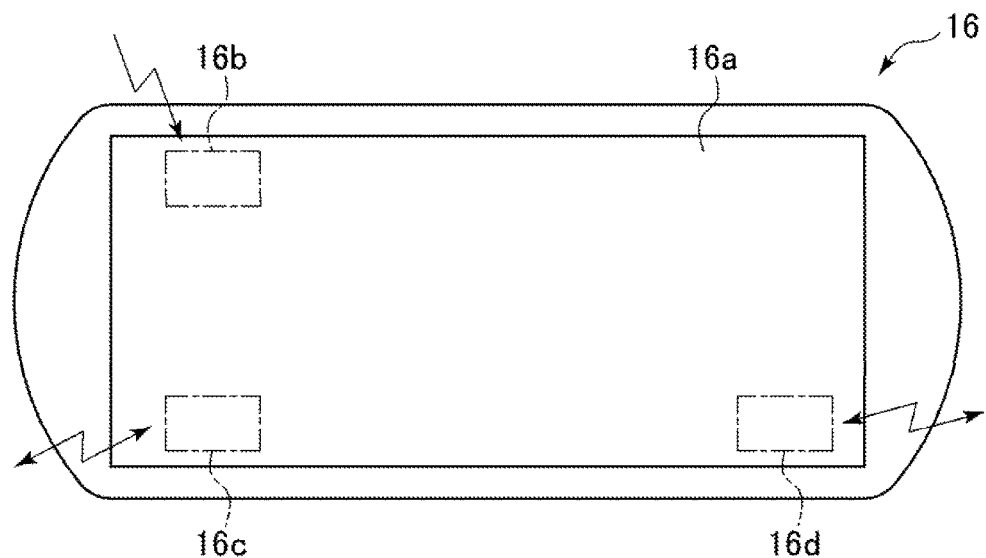
FIG. 2 is a diagram illustrating an example of appearance of a user terminal.

On the other hand, each of the user terminals 16 is a battery-driven portable computer game system. As an example of appearance is shown in FIG. 2, the user terminal 16 includes a touch screen 16a on the front face. Further, the user terminal 16 incorporates a positioning unit 16b and a communication section. The positioning unit 16b measures the position (latitude and longitude) of the user terminal 16 using a GPS (Global Positioning System). The communication section (e.g., a mobile phone communication unit 16c adapted to handle data communication using a mobile phone network and a wireless LAN communication unit 16d adapted to handle data communication using a wireless LAN in the present embodiment) handles data communication. Further, in addition to the above, the user terminal 16 includes, for example, a control section, a storage section, buttons, and so on. The control section includes a program-controlled device such as CPU that operates in accordance with a program installed in the user terminal 16. The storage section includes, for example, storage elements such as ROM and RAM and a hard-disk drive. The user terminal 16 selectively uses the mobile phone communication unit 16c or the wireless LAN communication unit 16d in accordance with the communication environment to connect to the computer network 10 and communicate data with the user position management server 12 and the information server 14.

The user terminal 16 repeatedly measures its own position using a satellite signal and holds these positioning results. It should be noted that the user terminal 16 may measure its position in other way as will be described later. Further, the user terminal 16 also holds data representing game program playing records. The position measurement results and the game playing records are uploaded to the user position management server 12 in response to a user operation or automatically every preset period of time. The user position management server 12 holds the position measurement results and the playing records that are uploaded from the large number of user terminals 16 as described above.

Figure 3:
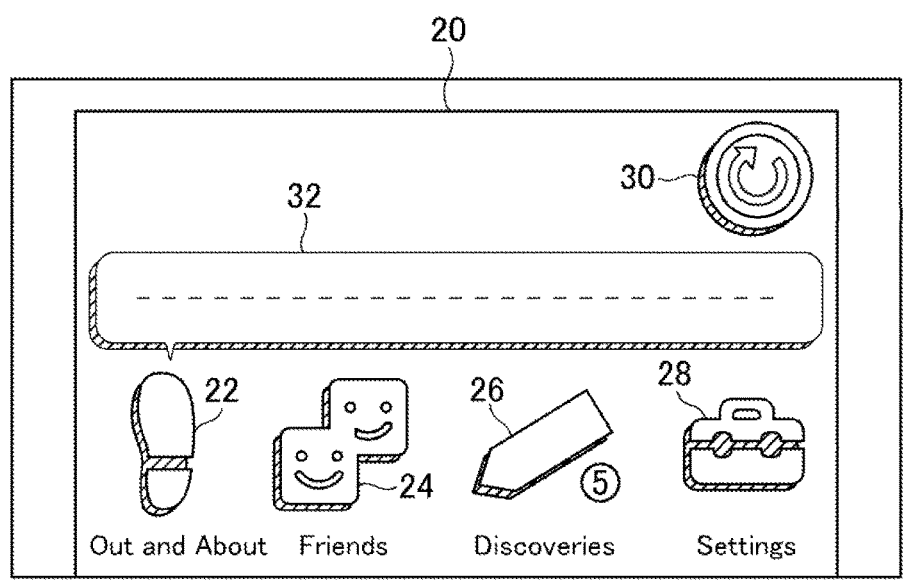
FIG. 3 is a diagram illustrating an example of a main menu image.

FIG. 3 illustrates an example of a main menu image 20 displayed on the touch screen 16a of the user terminal 16. The main menu image 20 appears first after the execution of the program according to the present embodiment following the activation of the user terminal 16. Button icons 22, 24, 26, 28, and 30 and a message 32 are arranged in the main menu image 20. In the present embodiment, the button icons 22, 24, 26, 28, and 30 can be operated by a user by tapping on the touch screen 16a. That is, the button icons 22, 24, 26, 28, and 30 can be tapped by the user.

The message 32 displays information relating to the button icons 22, 24, 26, and 28. Further, the details of the message 32 can be displayed on the touch screen 16a when the area of the message 32 is tapped by the user. Still further, the user terminal 16 uploads the data of the position measurement results and game playing records described above to the user position management server 12 when the button icon 30 is tapped by the user.

Figure 4:
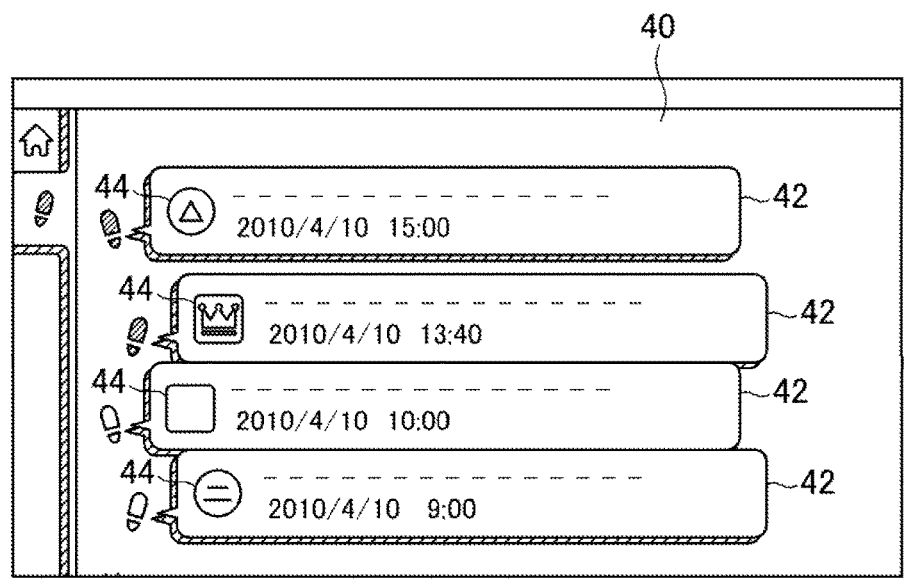
FIG. 4 is a diagram illustrating an example of a traveling route image.

FIG. 4 is a diagram illustrating an example of a traveling route image 40 displayed when the user taps the button icon 22. The traveling route image 40 as a whole is actually vertically long, and part thereof is displayed on the touch screen 16a. Then, the user can change the area appearing on the touch screen 16a by performing a predetermined operation on the touch screen 16a such as flicking. This allows a desired area of the entire traveling route image 40 to be displayed on the touch screen 16a.

The user terminal 16 repeatedly measures its own position and holds the measured positions. Event record images 42 are arranged in the traveling route image 40 in the order of measurement time. Each of the event record images 42 includes an event character string indicating the event that took place at the position where the user terminal 16 was held and a measurement date and time. In the present embodiment, the event record images 42 are arranged from top in the order of the most recent to earliest measurement results. Further, the event record images 42 can be tapped. Although each of the event record images 42 includes an event character string and a measurement date and time here, each of the event record images 42 may include an address character string indicating the address of the position where the user terminal 16 is held rather than an event character string. An address character string associated with a measured position may be correlated with the measured position and stored in advance in the user terminal 16. Alternatively, an address character string may be similarly stored in the information server 14. In the latter case, when a measured position is transmitted to the information server 14, the server 14 reads the address character string correlated with the measured position and transmits it back to the user terminal 16.

While repeatedly measuring its own position by the positioning unit 16b, the user terminal 16 holds a newly measured position only if that position is at least at a predetermined distance (e.g., 2 km) from the most recent position already held by the user terminal 16. Conversely, the user terminal 16 does not hold a newly measured position only if that position is at a distance smaller than the predetermined distance from the most recent position already held by the user terminal 16. Further, although holding only a predetermined number of measurement results (e.g., 20), the user terminal 16 selects only some of these measurement results that are useful for representing the traveling route of the user terminal 16. For example, the elapsed time from the last measurement time and the assessment value, an increasing function of the distance from the last measured position, are calculated for each position measurement result, thus selecting a predetermined number of top-ranked position measurement results. Then, only the event record images 42 associated with the selected position measurement results are included in the traveling route image 40. This makes it possible to show only useful travels in the traveling route image 40, thus allowing the easy-to-understand traveling route image 40 to be provided. Further, it is possible to minimize the display of useless information, thus contributing to efficient use of the touch screen 16a. Still further, an event image 44 is arranged at the left edge of each of the event record images 42. The event image 44 is associated with the event indicated by the event character string arranged in the event record image 42.

A footprint image on a white or black background is shown on the left side of each of the event record images 42. A footprint image on a white background indicates that the associated event record image 42 is associated with a position measurement result obtained automatically every preset period of time. On the other hand, a footprint image on a black background indicates that the associated event record image 42 is associated with a position measurement result obtained by user operation.

Figure 5:
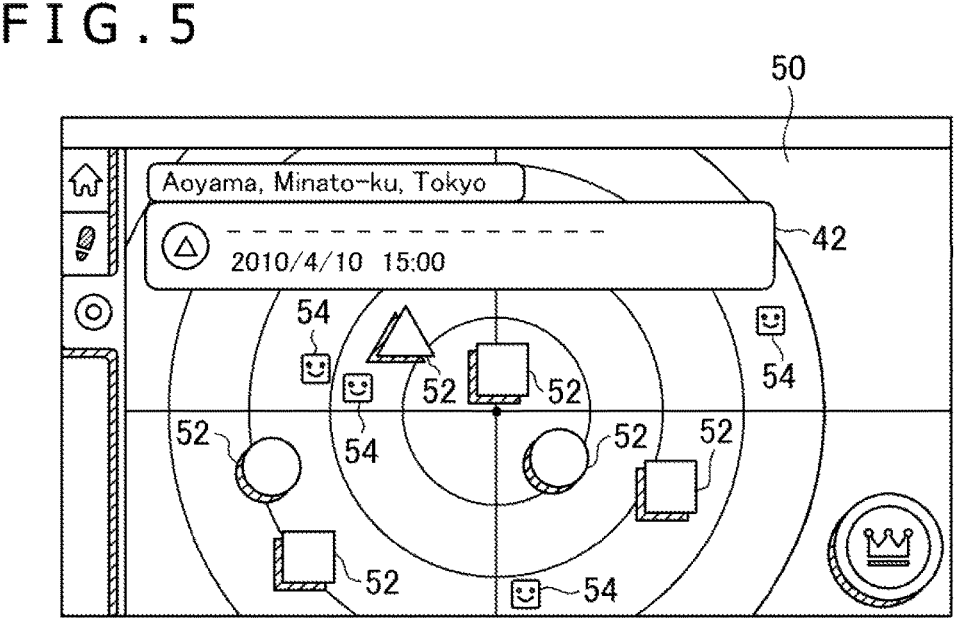
FIG. 5 is a diagram illustrating an example of a radar image.

FIG. 5 illustrates a radar image 50 displayed on the touch screen 16a when one of the event record images 42 is tapped in the traveling route image shown in FIG. 4. A black circle is shown at the center of the radar image 50 to indicate the user himself or herself. Avatar images 52 of other users are shown around the black circle. The privacy setting of the avatar images 52 is "Public." The avatar images 52 can be tapped. Further, small images 54 which hint on the presence of other users are also shown in the radar image 50. The privacy setting of the small images 54 is "Private." Here, the display position of each of the avatar images 52 on the touch screen 16a is determined based on the position actually measured by the positioning unit 16b. That is, the positions of other "Public" users relative to the user himself or herself are calculated based on the position measured by the positioning unit 16b and uploaded to the user position management server 12, and the display position of each of the avatar images 52 on the touch screen 16a is determined based on the calculated relative position. On the other hand, the display position of each of the small images 54 on the touch screen 16a is determined by random numbers. Further, the tapped event record image 42 and an address character string are arranged at the top edge of the radar image 50. The address character string indicates the address of the position where the event indicated by the event record image 42 took place.

When the user taps the button icon 24 arranged in the main menu image 20 shown in FIG. 3, the avatar image 52 of each of his or her friends and a friend image having the latest information about that friend are displayed on the touch screen 16a. Each friend image is also vertically long, and only the display area which is part thereof appears on the touch screen 16a. Then, the user can move the display area by performing a predetermined operation on the touch screen 16a.

Figure 6:
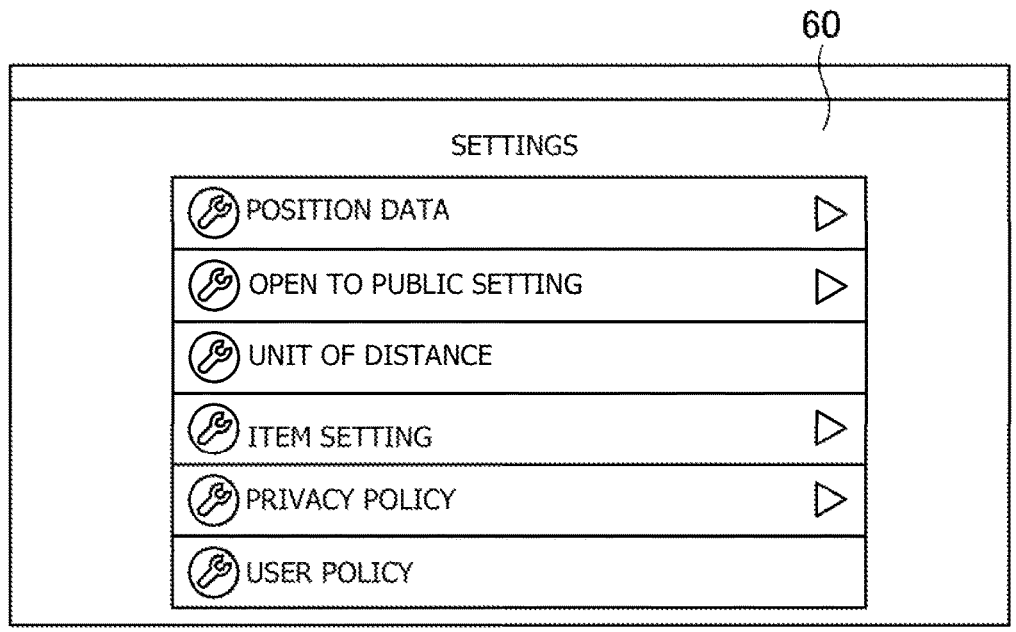
FIG. 6 is a diagram illustrating an example of a setting image.
Figure 7:
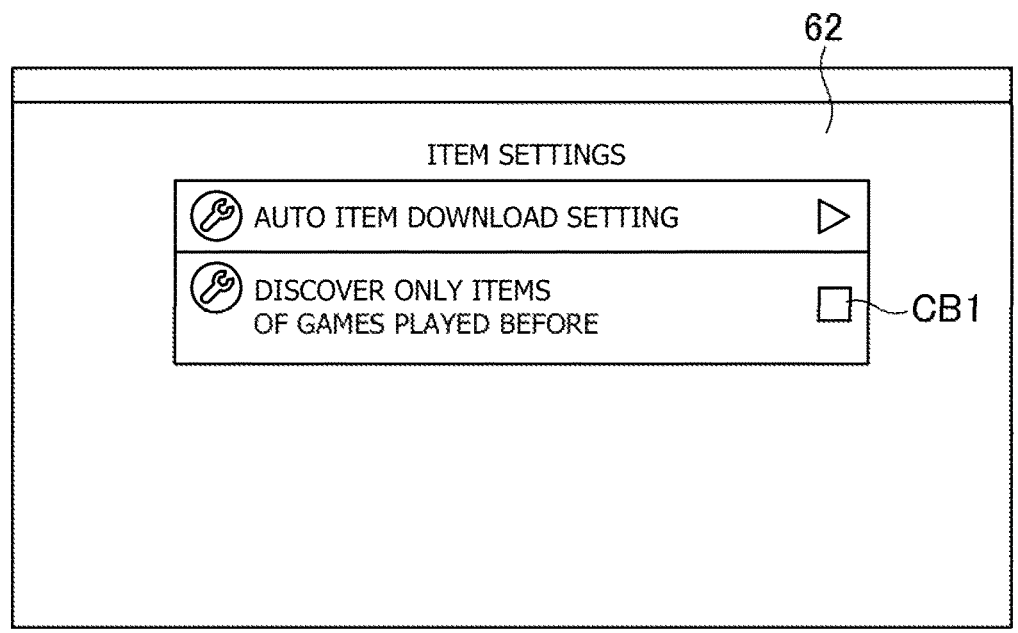
FIG. 7 is a diagram illustrating an example of an item setting image.

FIG. 6 illustrates a setting image 60 which is displayed on the touch screen 16a when the button icon 28 is tapped in the main menu image shown in FIG. 3. When the user taps the area shown as "Item Setting" in the setting image 60, an item setting image 62 illustrated in FIG. 7 appears on the touch screen 16a.

An image showing character string that says "Auto Item Download Setting" is arranged in the item setting image 62.

This image can be tapped by the user. Further, another image showing character string that says "Discover only items of games played before" is also arranged in the item setting image 62. Still further, a checkbox (hereinafter referred to as a discovery limiting checkbox CB1) is arranged in the right side of this image. This checkbox can be tapped by the user. The discovery limiting checkbox CB1 toggles between a checked state (a state in which a check is displayed) and an unchecked state (a state in which a check is not displayed) each time the discovery limiting checkbox CB1 is tapped by the user.

Figure 8:
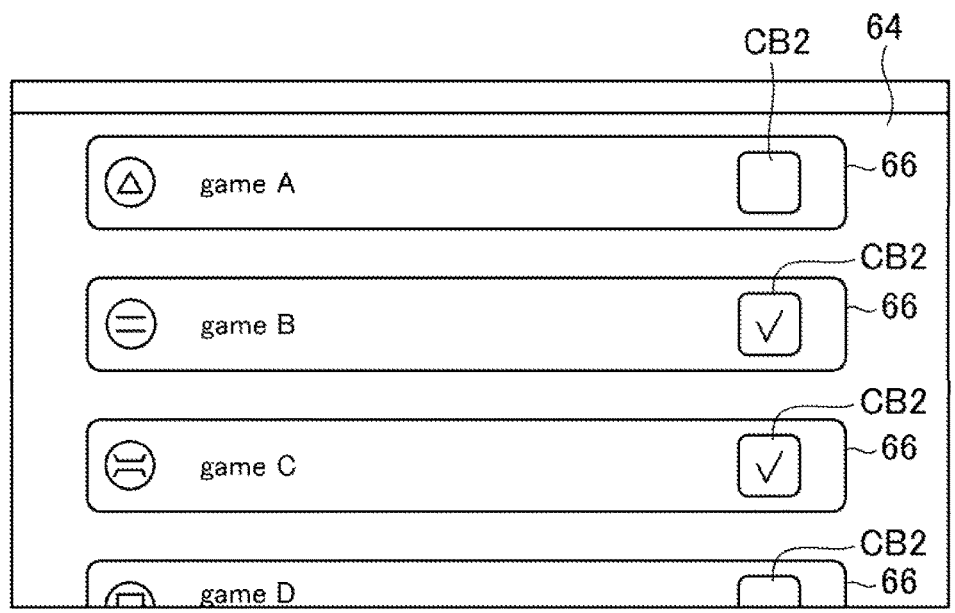
FIG. 8 is a diagram illustrating an example of an automatic download setting image.

When the image showing character string that says "Auto Item Download Setting" is tapped by the user, an automatic download setting image 64 illustrated in FIG. 8 appears on the touch screen 16a.

Individual setting images 66, each for one of the game programs installed in the user terminal 16, are arranged vertically in the automatic download setting image 64. Information typifying a game program (e.g., image typifying the game program and a character string representing the title of the game program) and a checkbox that can be tapped by the user (hereinafter referred to as an automatic download checkbox CB2) are arranged side by side in each of the individual setting images 66. The automatic download checkbox CB2 toggles between a checked state (a state in which a check is displayed) and an unchecked state (a state in which a check is not displayed) each time the automatic download checkbox CB2 is tapped by the user. If a game program is associated with the individual setting image 66 whose automatic download checkbox CB2 is checked, and if a predetermined condition is satisfied for an item correlated with the game program, the game program is set to a state in which the item is downloaded to the user terminal 16 from the information server 14 without waiting for the acceptance of a download permission from the user (hereinafter an automatic download state). On the other hand, if a game program is associated with the individual setting image 66 whose automatic download checkbox CB2 is unchecked, and if a predetermined condition is satisfied for an item correlated with the game program, the game program is set to a state in which the item is downloaded to the user terminal 16 from the information server 14 in response to the acceptance of a download permission from the user (hereinafter a manual download state).

Figure 9:
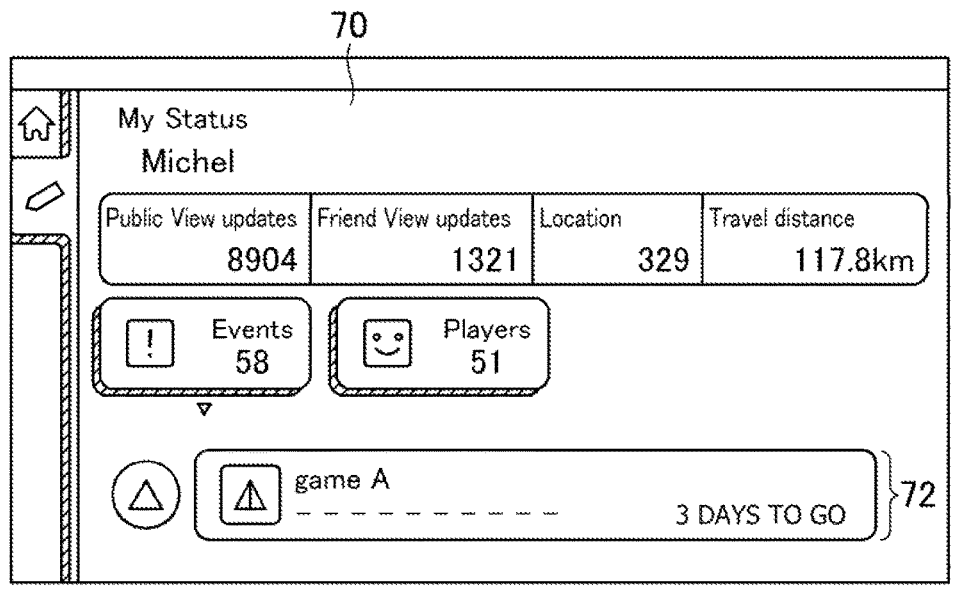
FIG. 9 is a diagram illustrating an example of a discovery image.

FIG. 9 is a diagram illustrating an example of a discovery image 70 which is displayed when the button icon 26 is tapped in the main menu image 20 shown in FIG. 3. An image showing a character string that says "Events" and another image showing a character string that says "Players" are arranged in the discovery image 70. On the other hand, these images can be tapped by the user. Then, information displayed at the bottom of the discovery image 70 changes when the image showing a character string that says "Events" or that showing a character string that says "Players" is tapped by the user.

For example, when the button icon 26 appearing in the main menu image shown in FIG. 3 is tapped by the user, a list of details of the events that took place (e.g., item discovery event in the present embodiment) is displayed at the bottom of the discovery image 70 as illustrated in FIG. 9. When the image showing a character string that says "Events" is tapped by the user, a list of details of the events that took place is similarly displayed. In the present embodiment, an item discovery event is associated with item information 72. On the other hand, when the image showing a character string that says "Players" is tapped by the user, a list of information is displayed at the bottom of the discovery image 70 for those users who satisfy a predetermined condition.

Figure 10:
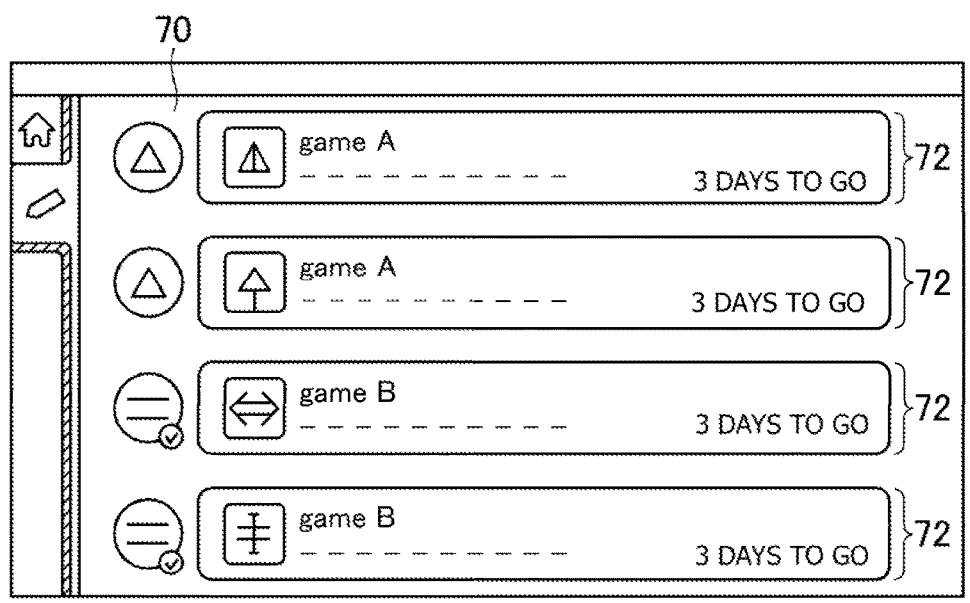
FIG. 10 is a diagram illustrating an example of a discovery image.

In the present embodiment, the item information 72 is arranged vertically on the touch screen 16a. Then, the area as a whole in which the item information 72 is arranged is actually vertically long, and the upper end thereof is shown in FIG. 9. Then, the user can change the item information 72 appearing on the touch screen 16a by performing a predetermined operation on the touch screen 16a such as flicking. FIG. 10 illustrates an example in which the four pieces of item information 72 are displayed on the touch screen 16a as the discovery images 70.

The item information 72 includes an icon associated with a game program, an icon arranged on the right side of the above icon and associated with an item, the title of the game program, the title of the item, and an image having days remaining until the expiration date of the item. On the other hand, if an item has been downloaded, a marking (e.g., a circular image with a checkmark arranged therein in the present embodiment) is arranged at the bottom right of the icon associated with the game program to indicate that the item has already been downloaded.

Figure 11:
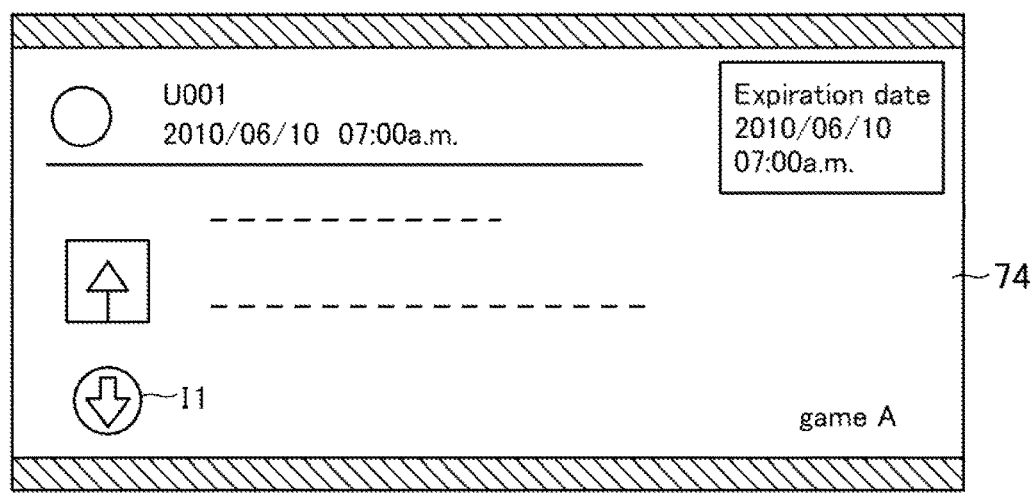
FIG. 11 is a diagram illustrating an example of a detailed item image.

The item information 72 can be tapped. For example, when the item information 72 is tapped by the user, an item detail image 74 associated with the tapped piece of item information 72 appears on the touch screen 16a to indicate the details of the item. FIG. 11 illustrates an example of the item detail image 74 which is displayed when the second item information 72 from top shown in FIG. 10 is tapped. FIG. 12 illustrates an example of the item detail image 74 which is displayed when the second item information 72 from bottom shown in FIG. 10 is tapped.

It should be noted that, in the present embodiment, when one of the avatar images 52 arranged in the radar image 50 shown in FIG. 5 is tapped, five titles of the game programs executed in the user terminal 16 of the user associated with the avatar image 52 appear. Then, when the user taps one of the displayed titles of the game programs, the item detail image 74 of an item discovered for the game program appears on the touch screen 16a.

The item detail image 74 has a user ID, i.e., the identifier of the user who provided the item, the date and time at which the item was provided, the icon associated with the item, and the details of the item. Further, the expiration date and time of the item is arranged at the top right of the item detail image 74. Still further, the title of the game program associated with the item is arranged at the bottom right of the item detail image 74. Still further, an icon is arranged at the bottom left of the item detail image 74. This icon is associated with the process performed when tapped.

In the present embodiment, for example, an icon I1 is arranged at the bottom left of the item detail image 74 of an item that has yet to be downloaded as shown in FIG. 11. The icon I1 includes, in its circle, a downward-pointing arrow to indicate a download process of the item. The icon I1 can be tapped. For example, when the icon I1 is tapped by the user, the item associated with the item detail image 74 is downloaded to the user terminal 16 from the information server 14. Then, in the present embodiment, when an item is downloaded to the user terminal 16, the user can set whether or not to set the game program associated with the item so that the game program is automatically downloaded. That is, it is possible to set whether or not to download, from the information server 14 to the user terminal 16, items associated with the game program without waiting for a download permission from the user from this time forward.

Further, in the present embodiment, for example, an icon (icon I2 having a character string that says "start") is arranged at the bottom left of the item detail image 74 of an item that has already been downloaded as illustrated in FIG. 12. The icon indicates a startup process of the game program associated with the item. The icon I2 can be tapped. For example, when the icon I2 is tapped by the user, the user terminal 16 starts up the game program associated with the item detail image 74. The user can play games as described above.

Figure 13:
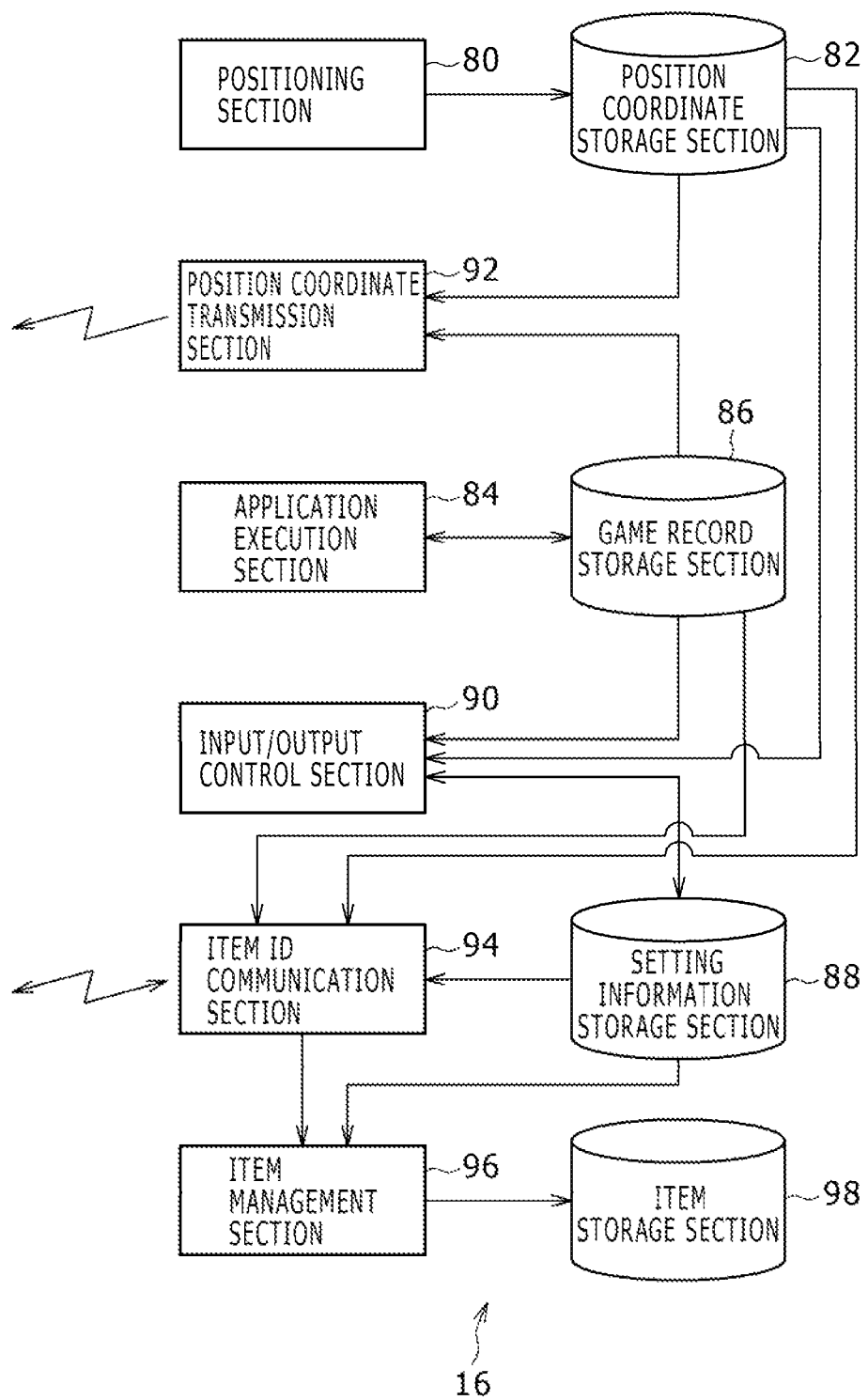
FIG. 13 is a functional block diagram illustrating examples of functions of a user terminal.

A further detailed description will be given, in particular, of the configuration relating to items of all the configuration of the information processing system described above. FIG. 13 is a functional block diagram illustrating examples of functions of the user terminal 16. As illustrated in FIG. 13, the user terminal 16 functionally includes a positioning section 80, a position coordinate storage section 82, an application execution section 84, a game record storage section 86, a setting information storage section 88, an input/output control section 90, a position coordinate transmission section 92, an item ID communication section 94, an item management section 96, and an item storage section 98. FIG. 13 primarily illustrates the functions relating to items. It should be noted that the user terminal 16 according to the present embodiment may have functions that are not shown in FIG. 13. In the present embodiment, the user terminal 16 functions as each of the sections shown in FIG. 13 when the program that is installed in the user terminal 16, a computer, and that includes the instructions associated with the functions of the respective sections shown in FIG. 13 is executed by the control section of the user terminal 16. This program is supplied to the user terminal 16 via a computer-readable information storage medium such as optical disc, magnetic disk, magnetic tape, magneto-optical disk, or flash memory or via communication means such as the Internet.

The positioning section 80 primarily includes the positioning unit 16b, activating the positioning unit 16b on a regular basis (e.g., every 30 minutes), receiving a satellite signal (GPS signal), and generating position coordinates (latitude and longitude) from the satellite signal. If the user explicitly instructs that a position be measured using the touch screen 16a, the positioning section 80 may also activate the positioning unit 16b, receive a satellite signal, and generate position coordinates from the signal.

The positioning section 80 may also acquire the position coordinates of the user terminal 16 based on identification information of wireless access points with which the wireless LAN communication unit 16d can communicate as well as other necessary information. For example, identification information and position coordinates of wireless access points are stored in correlation with each other in a server not shown that is connected to the computer network 10. The positioning section 80 transmits identification information to the server, thus acquiring the position coordinates correlated with the identification information. The positioning section 80 may transmit, to the server, identification information of a plurality of wireless access points and the intensity of radio waves from each of the wireless access points, and the server may calculate the position coordinates by assigning weights based on radio wave intensities and combining the position coordinates of the wireless access points and transmit the position coordinates back to the positioning section 80. Similarly, the position coordinates of the user terminal 16 may be acquired based on identification information of mobile phone base stations with which the mobile phone communication unit 16c can communicate as well as other necessary information. It should be noted that the positioning section 80 may transmit, to the user position management server 12, identification information of wireless access points and mobile phone base stations as well as other necessary information, and the user position management server 12 may acquire the position coordinates associated with each of these pieces of information rather than the positioning section 80 acquiring the position coordinates and transmitting the position coordinates to the user position management server 12.

The position coordinate storage section 82 stores a predetermined number of (e.g., 10) pairs of position coordinates and measurement dates and times of the position coordinates in correlation with each other as illustrated in FIG. 14. Each time the positioning section 80 generates position coordinates, the positioning section 80 reads the position coordinates that were stored last in the position coordinate storage section 82 and calculates the distance between the newly generated position coordinates and the read position coordinates. Then, the positioning section 80 stores the newly generated position coordinates together with the measurement date and time thereof in the position coordinate storage section 82 if the distance therebetween is equal to or greater than a predetermined distance (e.g., 2 km). At this time, the positioning section 80 deletes a combination of position coordinates and measurement date and time if a predetermined number of days (e.g., seven days) or more have elapsed from the measurement date and time. On the other hand, if the predetermined number of combinations of position coordinates and measurement date and time are stored in the position coordinate storage section 82, and if the predetermined number of days have yet to elapse from the measurement dates and times of these combinations, the positioning section 80 deletes the oldest combination of position coordinates and measurement date and time. Then, the positioning section 80 stores the newly generated position coordinates together with the measurement date and time in its place. On the other hand, if the distance between the newly generated position coordinates and the read position coordinates is smaller than the predetermined distance, the positioning section 80 discards the newly generated position coordinates rather than storing them in the position coordinate storage section 82.

The application execution section 84 executes an application program (e.g., game program in the present embodiment). The application program may be downloaded from other computer via the computer network 10 or stored in a computer-readable information storage medium such as CD-ROM or DVD-ROM and installed therefrom to the user terminal 16.

The game record storage section 86 stores title IDs of a predetermined number of game programs (e.g., five) executed recently by the application execution section 84, viewing levels, total times played, and dates and times last played in correlation with each other as illustrated in FIG. 15. The title ID is information identifying each of the game programs. The total time played is the total number of hours spent on playing the game program. The viewing level is information representing the extent to which the user is enthusiastic about the game and is calculated from information such as difference between the release date of the game program and the current date, and total time played. The date and time last played is the date and time when the game program was played last (date and time when the program was started up or exited). On the other hand, if a given item occurrence condition is satisfied in a game program executed by the application execution section 84, the application execution section 84 stores an item ID, item identification information associated with the item occurrence condition, in the game record storage section 86.

The setting information storage section 88 stores a variety of information indicating user-related settings. More specifically, the setting information storage section 88 stores an install flag, a discovery limiting flag, privacy setting-related information, and so on for each of the game programs installed in the user terminal 16. Here, the install flag refers to a flag indicating whether or not the game program is in an automatic installation state. On the other hand, the discovery limiting flag refers to a flag indicating the setting as to whether or not to discover only items for the games that have already been played before.

The input/output control section 90 handles tasks including generating and displaying various screens that appear on the touch screen 16a of the user terminal 16 and performing processes appropriate to operations made on the touch screen 16a by the user.

For example, when the state of the discovery limiting checkbox CB1 of the item setting image 62 toggles to checked, the input/output control section 90 sets the discovery limiting flag to a value that indicates that only the items for the games that have already been played before should be discovered (e.g., '1' in the present embodiment). Then, when the state of the discovery limiting checkbox CB1 of the item setting image 62 toggles to unchecked, the input/output control section 90 sets the discovery limiting flag to a value that indicates that the items for all the games should be discovered (e.g., '0' in the present embodiment).

Further, when the automatic download checkbox CB2 of one of the individual setting images 66 toggles to checked, the input/output control section 90 sets the install flag for the game program associated with the individual setting image 66 to a value indicating an automatic installation state (e.g., '1' in the present embodiment). Then, when the automatic download checkbox CB2 of one of the individual setting images 66 toggles to unchecked, the input/output control section 90 sets the install flag for the game program associated with the individual setting image 66 to a value indicating a manual installation state (e.g., '0' in the present embodiment).

The position coordinate transmission section 92 transmits, to the user position management server 12, a plurality of combinations of position coordinates and measurement dates and times stored in the position coordinate storage section 82 and a predetermined number of combinations of game program title IDs, viewing levels, and total times played stored in the game record storage section 86 using the mobile phone communication unit 16c or the wireless LAN communication unit 16d. This transmission may be performed when the user explicitly instructs the transmission using the touch screen 16a. At this time, it is preferable to display the plurality of combinations of position coordinates and measurement dates and times stored in the position coordinate storage section 82 on the touch screen 16a and verify whether to transmit these combinations to the user position management server 12. Further, the combinations of position coordinates and measurement dates and times which are not desired to be transmitted may be deleted so that only the remaining combinations are transmitted to the user position management server 12. Alternatively, the user may set whether to omit such a verification. In this case, the plurality of combinations of position coordinates and measurement dates and times stored in the position coordinate storage section 82 are automatically transmitted on a regular basis (e.g., once a day). The data transmitted by the position coordinate transmission section 92 is managed by the user position management server 12.

The item ID communication section 94 transmits item IDs, item identification information, and receives gift data which will be described later. As described above, when a given item occurrence condition is satisfied in a game program executed by the application execution section 84, the application execution section 84 stores, in the game record storage section 86, the title ID of the game program under execution and the item ID, identification information of the item associated with the item occurrence condition. When the title ID and the item ID are stored in the game record storage section 86 as described above, the item ID communication section 94 transmits the title ID and the item ID to the user position management server 12 using the mobile phone communication unit 16c or the wireless LAN communication unit 16d. At this time, the title ID and the item ID are transmitted to the user position management server 12 together with at least one pair of position coordinates stored in the position coordinate storage section 82 (e.g., the most recent pair of position coordinates) and the user ID, user identification information of the user terminal 16.

The user position management server 12 according to the present embodiment manages position coordinates using area IDs, information identifying (specifying) each area of a mesh obtained by dividing an area to be managed (e.g., entire area on the earth) into a mesh of many areas.

Upon receipt of a title ID, an item ID, position coordinates, and a user ID from the item ID communication section 94, the user position management server 12 derives an area ID of the area that includes the received position coordinates. Then, the user position management server 12 determines the expiration date of the item based on the received data. In the present embodiment, we assume that the expiration date is three months from the current date and time. Then, the user position management server 12 stores a combination of the received title ID, the received item ID, the received user ID, and the determined expiration date in correlation with the area ID of the area that includes any one pair of transmitted position coordinates. Data including an area ID, a title ID, an item ID, a user ID, and an expiration date that are correlated with each other will be hereinafter referred to as gift data. FIG. 16 schematically illustrates an example of gift data stored in the user position management server 12.

The item ID communication section 94 also handles reception of gift data, stored in the user position management server 12, at predetermined timing. In this case, the item ID communication section 94 transmits, to the user position management server 12, position coordinates stored in the position coordinate storage section 82. Then, the user position management server 12 transmits, back to the item ID communication section 94, one or a plurality of pieces of gift data that are stored in correlation with the area ID of the area that includes the received position coordinates. Then, the item ID communication section 94 receives the one or the plurality of pieces of gift data from the user position management server 12.

Figure 17A:
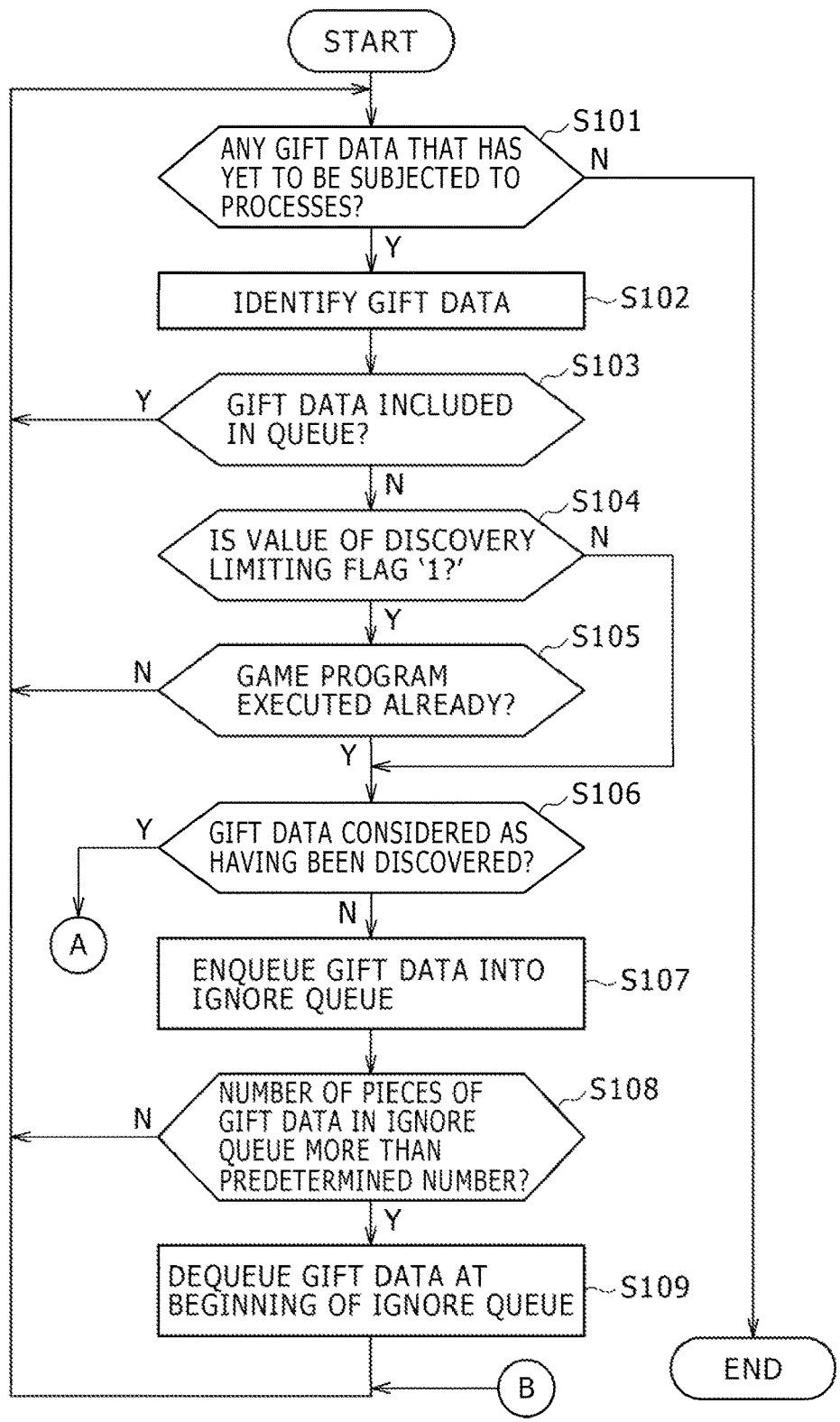
FIG. 17A is a flowchart illustrating an example of a process performed by the user terminal according to the present embodiment.
Figure 17B:
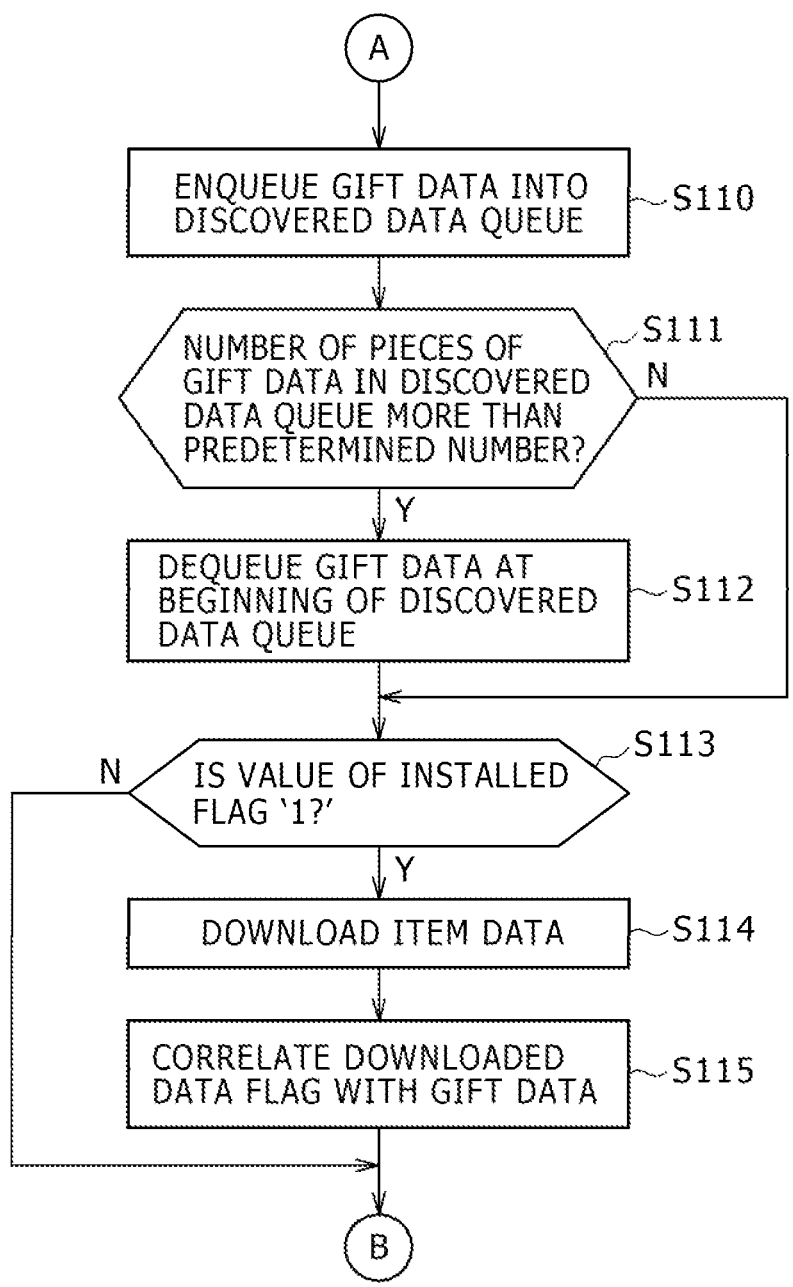
FIG. 17B is a flowchart illustrating an example of a process performed by the user terminal according to the present embodiment.

A description will be given here of an example of a flow of processes performed in the user terminal 16 according to the present embodiment when one or a plurality of pieces of gift data is received with reference to a flow chart illustrated in FIGS. 17A and 17B.

Figure 19:
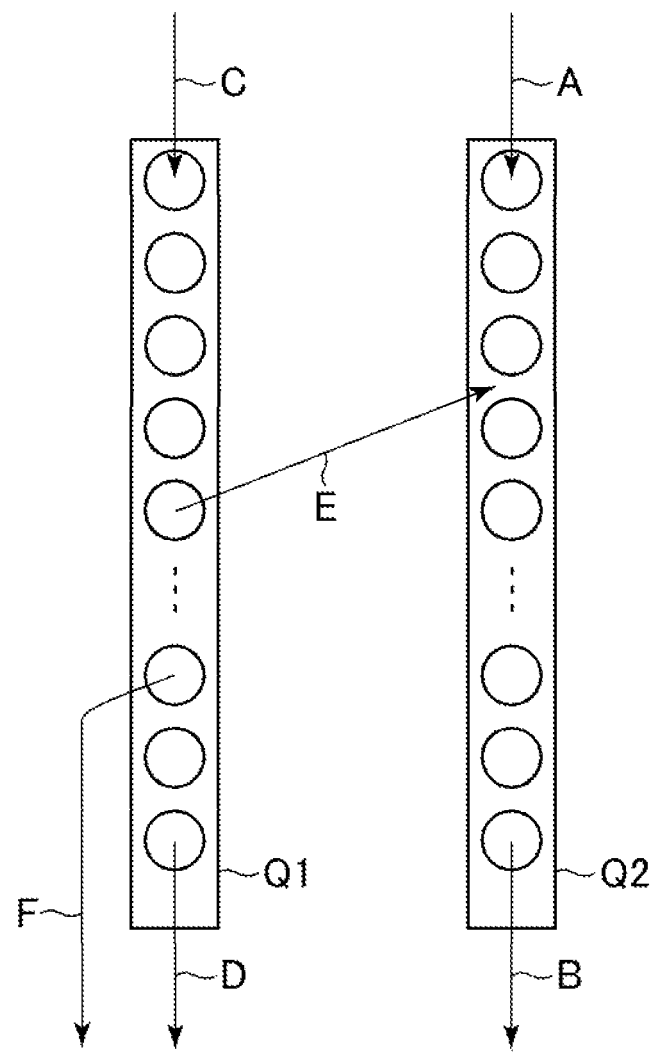
FIG. 19 is a diagram conceptually illustrating an example of an item management queue.

It should be noted that FIG. 18 conceptually illustrates an example of state transitions of received gift data. Further, we assume that, in the present embodiment, an item management queue (initially empty) is stored in advance in the game record storage section 86 of the user terminal 16 to manage received gift data. FIG. 19 conceptually illustrates an example of an item management queue used in the description given below. As illustrated in FIG. 19, the item management queue conceptually includes a discovered data queue Q1 and a ignore queue Q2. Gift data is enqueued into the discovered data queue Q1 and the ignore queue Q2. It should be noted that, in FIG. 19, each of the circles shown in the discovered data queue Q1 and the ignore queue Q2 corresponds to a piece of gift data.

First, the item management section 96 verifies whether or not there is any piece of gift data of all the gift data received by the item ID communication section 94 that has yet to be subjected to the following processes (S101). When there are such pieces of gift data (Y in S101), the item management section 96 identifies one piece of gift data that has yet to be subjected to the following processes (S102).

Then, the item management section 96 verifies whether or not the gift data identified by the process in step S102 is included in the discovered data queue Q1 or the ignore queue Q2 (S103). Then, if the gift data identified by the process in step S102 is included in the discovered data queue Q1 or the ignore queue Q2 (Y in S103), the item management section 96 returns to the process in step S101.

If the gift data identified by the process in step S102 is not included in the discovered data queue Q1 or the ignore queue Q2 (N in S103), the item management section 96 verifies whether or not the value of the discovery limiting flag is '1' (S104). If so (Y in S104), the item management section 96 verifies whether or not the game program identified by the title ID included in the gift data has been executed by the user terminal 16 (whether or not the game associated with the gift data has been played by the user terminal 16) (S105). Here, if it is verified that the game program identified by the title ID included in the gift data has yet to be executed (N in S105), the item management section 96 returns to the process in step S101.

If it is verified by the process in S104 that the value of the discovery limiting flag is '0' (N in S104), or if it is verified by the process in S105 that the game program identified by the title ID included in the gift data has been executed (Y in S105), the item management section 96 determines, based, for example, on random numbers, whether or not the gift data is considered as having been discovered (S106). In the present embodiment, we assume, for example, that the item management section 96 determines by a probability p that the gift data has been discovered, and determines by a probability (1-p) that the gift data has not been discovered.

If it is determined by the process in S106 that the gift data has not been discovered (N in S106), the item management section 96 correlates the gift data with the position coordinates transmitted to the user position management server 12 and the reception date and time of the gift data and adds (enqueues) the gift data into the ignore queue Q2 (arrow A in FIG. 19) (S107). The state of the gift data at this time corresponds to a state ST1 in FIG. 18. At this time, the item management section 96 verifies whether or not the number of pieces of gift data included in the ignore queue Q2 exceeds a predetermined number (e.g., whether or not 100 is exceeded) (S108). Here, if the number of pieces of gift data included in the ignore queue Q2 does not exceed the predetermined number (N in S108), the item management section 96 returns to the process in step S101.

If the number of pieces of gift data included in the ignore queue Q2 exceeds the predetermined number (Y in S108), the item management section 96 deletes (dequeues) the gift data at the beginning of the ignore queue Q2 (i.e., gift data that was enqueued at the earliest time) (arrow B in FIG. 19) (S109) and then returns to the process in S101. It should be noted that the state of the dequeued gift data at this time corresponds to the end state in FIG. 18.

On the other hand, if it is determined by the process in S106 that the gift data has been discovered (Y in S106), the item management section 96 correlates the gift data with the position coordinates transmitted to the user position management server 12 and the reception date and time of the gift data and adds (enqueues) the gift data into the discovered data queue Q1 (arrow C in FIG. 19) (S110). The state of the gift data at this time corresponds to a state ST2 in FIG. 18.

Then, the item management section 96 verifies whether or not the number of pieces of gift data included in the discovered data queue Q1 exceeds a predetermined number (e.g., whether or not 100 is exceeded) (S111).

If the number of pieces of gift data included in the discovered data queue Q1 exceeds the predetermined number (Y in S111), the item management section 96 deletes (dequeues) the gift data at the beginning of the discovered data queue Q1 (i.e., gift data that was enqueued at the earliest time) (arrow D in FIG. 19) (S112). It should be noted that the state of the dequeued gift data corresponds to the end state in FIG. 18.

If it is verified by the process in S111 that the number of pieces of gift data included in the discovered data queue Q1 does not exceed the predetermined number (N in S111), or if the process in S112 is terminated, the item management section 96 verifies whether or not the value of the install flag for the game program associated with the title ID is '1' (S113). Here, if the value of the install flag for the game program associated with the title ID is '0' (N in S113), the item management section 96 returns to the process in step S101.

On the other hand, if the value of the install flag for the game program associated with the title ID indicates an automatic download state (Y in S113), the item management section 96 downloads the data of the item associated with the item ID included in the gift data from the information server 14 (S114).

In the process in S114, the item management section 96 transmits, to the information server 14, for example, a request to transmit the item associated with the item ID included in the gift data. Then, the information server 14 transmits the requested data of the item to the user terminal 16 in response to the transmission request. Then, the item management section 96 of the user terminal 16 receives the item data and stores it in the item storage section 98.

Then, the item management section 96 correlates a downloaded data flag with the gift data associated with the item downloaded in the process in S114 (S115) and returns to the process in S101. The state of the gift data at this time corresponds to a state ST3 in FIG. 18.

If it is verified in the process in S101 that there is no piece of gift data of all the gift data received by the item ID communication section 94 that has yet to be subjected to the above processes (N in S101), the item management section 96 terminates the processes in the present processing example. As described above, the user terminal 16 according to the present embodiment repeats the above processes until all the pieces of gift data received by the item ID communication section 94 are identified by the process in S102.

It should be noted that, in the present embodiment, the input/output control section 90 arranges an icon at the bottom right of the button icon 26 when displaying the main menu image 20 on the touch screen 16a. The icon shows the number of newly discovered items inside thereof. The input/output control section 90 arranges, for example, the number of pieces of gift data that have been determined to have been discovered by the process in S106 from the date on which the program according to the present embodiment was exited last and beyond.

In the present embodiment, when generating the discovery image 70 and displaying it on the touch screen 16a, the input/output control section 90 arranges the item information 72 associated with the gift data so that the pieces of item information 72 are laid out from top to bottom in the order of the earliest to most recent reception dates and times of the gift data included in the discovered data queue Q1. Then, the input/output control section 90 arranges, for the gift data correlated with the downloaded flag, a marking at the bottom right of each of the icons associated with game programs to indicate that the item has been downloaded. As described above, in the present embodiment, the input/output control section 90 plays a role of notifying the user that items used for game programs are available. As described above, the present embodiment makes the user aware, through the discovery image 70, that an item discovery event has taken place.

It should be noted that icons associated with game programs and game program titles may be stored in advance in the user terminal 16 in correlation with title IDs. Alternatively, they may be stored in the information server 14 in the same manner. In the latter case, when a title ID is transmitted to the information server 14, the information server 14 reads the icon and the title correlated with the item ID and transmits them to the user terminal 16. Alternatively, the icon associated with the item and the item title may be stored in advance in the user terminal 16 in correlation with the item ID. Still alternatively, they may be stored in the information server 14 in the same manner. In the latter case, when an item ID is transmitted to the information server 14, the information server 14 reads the icon and the title correlated with the item ID and transmits them to the user terminal 16.

We assume that the user taps the item information 72 having a marking indicating that the item has been downloaded when the discovery image 70 is displayed on the touch screen 16a. In this case, the input/output control section 90 generates the item detail image 74 illustrated in FIG. 12 and displays it on the touch screen 16a. Then, we assume that the user taps the icon having a character string that says "start" that is arranged at the bottom left of the item detail image 74. As a result, the application execution section 84 starts up the game program associated with the item detail image 74, initiating the execution of the program.

On the other hand, we assume that the user taps the item information 72 with no marking indicating that the item has been downloaded when the discovery image 70 is displayed on the touch screen 16a. In this case, the input/output control section 90 generates the item detail image 74 illustrated in FIG. 11 and displays it on the touch screen 16a. Then, we assume that the user taps the icon that is arranged at the bottom left of the item detail image 74 and that indicates that the item can be downloaded. As a result, the item management section 96 downloads the data of the item associated with the item detail image 74 from the information server 14 and stores the data in the item storage section 98. Further, the item management section 96 correlates a downloaded data flag with the gift data associated with the item detail image 74 while at the same time storing the item data in the item storage section 98. It should be noted that the state of the gift data associated with the downloaded item data corresponds to the state ST3 in FIG. 18.

Figure 20:
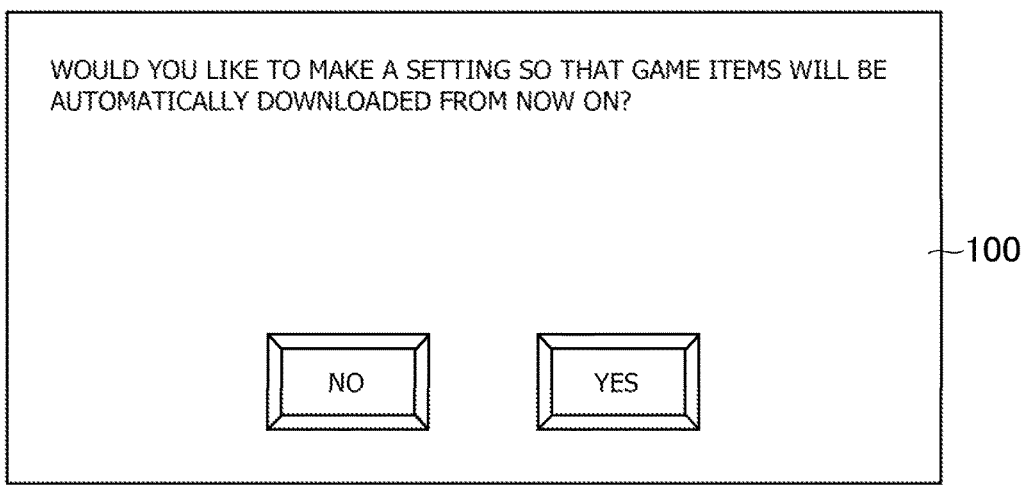
FIG. 20 is a diagram illustrating an example of an inquiry image.

Here, when the download of the item is complete, the input/output control section 90 displays, on the touch screen 16a, an inquiry image 100 illustrated in FIG. 20 from this time forward. The inquiry image 100 inquires about whether or not to automatically download items correlated with the game program that is, in turn, correlated with the downloaded item. The inquiry image 100 includes two buttons that can be tapped, one having a character string that says "Yes" and another having a character string that says "No."

Here, when the user taps the button having a character string that says "No," the input/output control section 90 displays the discovery image 70 on the touch screen 16a. When the user taps the button having a character string that says "Yes," the item management section 96 sets the install flag of the game program to a value indicating an automatic installation state (e.g., '1') first, and then the input/output control section 90 displays the discovery image 70 on the touch screen 16a. As described above, the present embodiment allows the user to change, to the automatic installation setting, a game program correlated with an item via the inquiry image 100 that appears when the download of that item is complete.

Further, in the present embodiment, there are times when a game program performs a process using data of an item correlated with the game program when the application execution section 84 executes the game program. Then, there are also times when the application execution section 84 deletes item data after having used that data.

Still further, in the present embodiment, if the expiration date correlated with gift data in the state ST2 is overdue, the item management section 96 correlates an expiration date overdue flag with the gift data. It should be noted that the state of the gift data at this time corresponds to a state ST4. Item data associated with the gift data cannot be downloaded.

In the present embodiment, if the expiration date correlated with gift data in the state ST3 is overdue, the item management section 96 correlates an expiration date overdue flag with the gift data. It should be noted that the state of the gift data at this time corresponds to a state ST5 in FIG. 18. Item data associated with the gift data cannot be used by game programs executed by the application execution section 84.

Further, in the present embodiment, for example, when a given process such as deletion of item data is performed, the item management section 96 may dequeue the gift data associated with the data from the discovered data queue Q1 and enqueue the data into the ignore queue Q2. At this time, the item management section 96 may enqueue the target gift data between two pieces of gift data, one whose reception date and time is immediately before that of the target gift data and another whose reception date and time is immediately after that of the target gift data (arrow E in FIG. 19). It should be noted that the state of the gift data enqueued into the ignore queue Q2 corresponds to the state ST1 in FIG. 18.

Alternatively, for example, when a given process is performed, the item management section 96 may dequeue the gift data associated with the data from the discovered data queue Q1 (arrow F in FIG. 19). It should be noted that the state of the gift data dequeued from the discovered data queue Q1 corresponds to the end state in FIG. 18.

The present embodiment allows the user to set, for a plurality of game programs, whether to download, from the information server 14, data of items correlated with a game program without waiting for the acceptance of a download permission from the user or download the data in response to the acceptance of the download permission from the user via a screen (touch screen 16a) that displays the automatic download setting image 64.

Further, in the present embodiment, the gift data included in the ignore queue Q2 is not subjected to the processes from S104 and beyond described above. Therefore, for example, even if data of an item associated with gift data is used and deleted by a program, but, as long as the gift data is included in the ignore queue Q2, it is possible to prevent the occurrence of a discovery event of an item associated with the gift data from being notified to the user.

Figure 21:
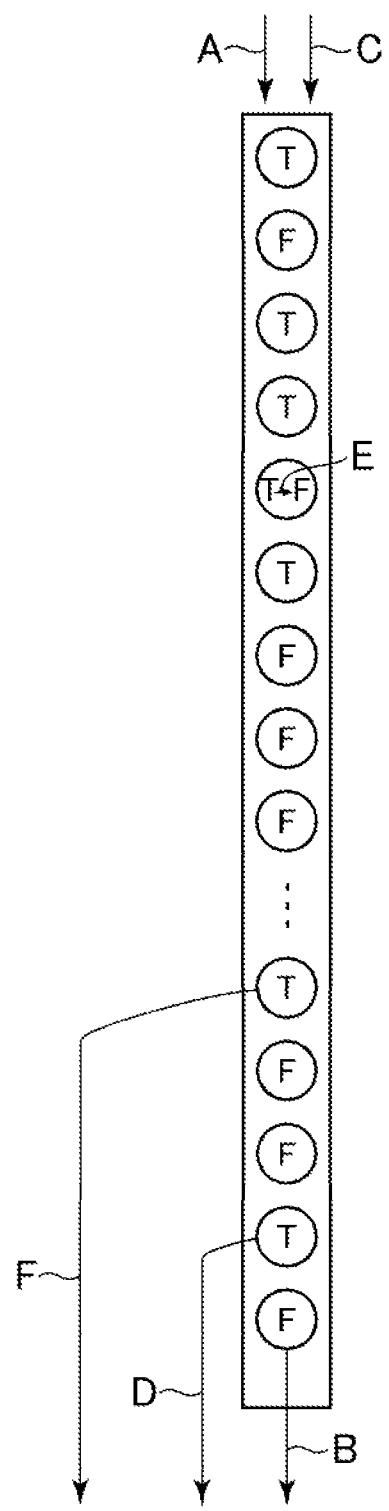
FIG. 21 is a diagram illustrating an implementation example of the item management queue.

It should be noted that a number of variations are possible as examples of implementing an item management queue. FIG. 21 is a diagram illustrating an implementation example of the item management queue. In the present implementation example, gift data is correlated with a discovered data/ignore flag that takes on, for example, one of two values, namely, "TRUE" (denoted as "T" in FIG. 21) and "FALSE" (denoted as "F" in FIG. 21) first, and then enqueued into an item management queue. Enqueueing of gift data into the discovered data queue Q1 in FIG. 19 corresponds to correlation of gift data with the discovered data/ignore flag whose value is "TRUE" followed by enqueueing of the gift data into the item management queue in FIG. 21 (arrow A in FIG. 21). It should be noted that enqueueing of gift data into the ignore queue Q2 in FIG. 19 corresponds to correlation of gift data with the discovered data/ignore flag whose value is "FALSE" followed by enqueueing of the gift data into the item management queue in FIG. 21 (arrow C in FIG. 21).

Further, in the process in S108 described above for the item management queue shown in FIG. 21, the item management section 96 verifies whether or not the number of pieces of gift data correlated with the discovered data/ignore flag whose value is "FALSE" exceeds the predetermined number (e.g., whether or not 100 is exceeded). Then, if the number of pieces of gift data correlated with the discovered data/ignore flag whose value is "FALSE" exceeds the predetermined number, the item management section 96 deletes (dequeues) the gift data of all the gift data correlated with the discovered data/ignore flag whose value is "FALSE" that was enqueued into the item management queue at the earliest time (arrow B in FIG. 21), and then returns to the process in S101.

On the other hand, in the process in S111 for the item management queue shown in FIG. 21, the item management section 96 verifies whether or not the number of pieces of gift data correlated with the discovered data/ignore flag whose value is "TRUE" exceeds the predetermined number (e.g., whether or not 100 is exceeded). Then, if the number of pieces of gift data correlated with the discovered data/ ignore flag whose value is "TRUE" exceeds the predetermined number, the item management section 96 deletes (dequeues) the gift data that was enqueued into the item management queue at the earliest time among the gift data correlated with the discovered data/ignore flag whose value is "TRUE" (arrow D in FIG. 21), and then returns to the process in S101.

Further, the process adapted to dequeue gift data from the discovered data queue Q1 and enqueue it into the ignore queue Q2 in FIG. 19 corresponds to the process adapted to change the value of the discovered data/ignore flag correlated with the gift data in the item management queue shown in FIG. 21 from "TRUE" to "FALSE" (arrow E in FIG. 21). Still further, the process adapted to dequeue gift data from the discovered data queue Q1 in FIG. 19 corresponds to the process adapted to dequeue gift data correlated with the discovered data/ignore flag whose value is "TRUE" from the item management queue (arrow F in FIG. 21).

It should be noted that, upon receipt of position coordinates and a specified search area size from the user terminal 16, the user position management server 12 according to the present embodiment determines, as a search area, a group of n×n (e.g., 1×1, 3×3, 5×5, 7×7, 9×9, and so on to 25×25) areas including an area that in turn includes the received position coordinates (e.g., at the center). Here, n is determined according to the specified size of the search area received from the user terminal 16. Then, the user position management server 12 reads a combination of the user ID and position coordinates that are stored in correlation with the area ID of each of the areas making up the determined search area, transmitting the combination back to the user terminal 16.

Further, upon receipt of a user ID from the user terminal 16, the user position management server 12 transmits the latest position coordinates stored in correlation with the user ID, the measurement date and time, and a predetermined number of pieces of game record data back to the user terminal 16. The user terminal 16 need only receive these pieces of information from the user position management server 12 when the title of the game being played by a specific user should be displayed on the touch screen 16a.

It should be noted that the present invention is not limited to the above embodiment.

For example, upon receipt of position coordinates from the user terminal 16, the user position management server 12 may transmit gift data, stored in correlation with the area ID of any one of the areas in a group of a predetermined number of areas (e.g., a group of p×p (e.g., 3×3, 5×5, 7×7, 9×9, and so on to 25×25) areas) which indicates the received position coordinates (e.g. at the center), back to the user terminal 16.

Further, the item management section 96 may identify a group of a predetermined number of areas based on position coordinates stored in the position coordinate storage section 82 when performing the processes in S101 to S115. Here, the item management section 96 may identify a group of a predetermined number of areas including an area that in turn includes the position coordinates stored in the position coordinate storage section 82 at the center. Here, the term "a group of a predetermined number of areas" refers, for example, to a group of p×p areas for a 100 km square. Then, the item management section 96 may delete gift data that is stored in correlation with the area IDs of areas that do not belong to the identified group of areas. This prevents the storage capacity of the user terminal 16 from becoming filled up.

Still further, data indicating when to verify the reception of gift data (e.g., data indicating that the reception should be verified at 1 a.m. every day) may be stored in advance in the user terminal 16. Then, at the reception verification time indicated by this data, the item management section 96 may calculate the distance travelled by the user terminal 16 from the previous data reception time based, not only, on the position coordinates stored in the position coordinate storage section 82 and correlated with the previous data reception date and time in gift data but also on the latest position coordinates stored in the position coordinate storage section 82. Then, the item management section 96 may determine whether or not the calculated distance travelled exceeds a predetermined first reference distance (e.g., 2 km). If it is determined that the calculated distance travelled exceeds the predetermined first reference distance, the item ID communication section 94 may transmit the latest position coordinates stored in the position coordinate storage section 82 to the user position management server 12. Then, the user position management server 12 may transmit, back to the item ID communication section 94, the gift data stored in correlation with the area ID of any one of the areas in the group of the predetermined number of areas including an area that in turn includes the received position coordinates. On the other hand, if it is determined otherwise, the item ID communication section 94 may not receive gift data. As described above, the item management section 96 may determine whether or not to receive gift data at predetermined time intervals (e.g., at intervals of one day).

Still further, each time the latest position coordinates are stored in the position coordinate storage section 82, the item management section 96 may calculate the distance travelled by the user terminal 16 from the previous data reception time based, not only, on the position coordinates stored in the position coordinate storage section 82 and associated with the previous data reception date and time, but also, on the latest position coordinates stored in the position coordinate storage section 82. Each time the latest position coordinates are stored in the position coordinate storage section 82, the item management section 96 may, for example, calculate the distance travelled by the user terminal 16 from the previous data reception time based, not only, on the position coordinates correlated with the reception date and time closest to the previous data reception date and time, but also, on the latest position coordinates stored in the position coordinate storage section 82. Then, the item management section 96 may determine whether or not the calculated distance travelled exceeds a predetermined second reference distance (e.g., 50 km). If it is determined that the calculated distance travelled exceeds the predetermined second reference distance, the item ID communication section 94 may transmit the latest position coordinates stored in the position coordinate storage section 82 to the user position management server 12 as described above. Then, the user position management server 12 may transmit, back to the item ID communication section 94, the gift data stored in correlation with the area ID of any one of the areas in the group of the predetermined number of areas including an area that in turn includes the received position coordinates.

Here, the predetermined second reference distance (e.g., 50 km) may be half the length of one side (e.g., 100 km) of the area made up of a group of a predetermined number of areas (e.g., a group of p×p areas for a 100 km square). At this time, a circular area having, as a radius, the predetermined second reference distance (e.g., 50 km) is contained in the area made up of the group of the predetermined number of areas (e.g., a group of p×p areas for a 100 km square) identified by the user position management server 12 based on the position coordinates transmitted to the user position management server 12 from the user terminal 16. This contributes to a lower likelihood that gift data correlated with the area ID of the area including the current position of the user terminal 16 may be not stored in the user terminal 16. It should be noted that the circular area having, as a radius, the predetermined second reference distance (e.g., 50 km) is allowed to match the area made up of the group of the predetermined number of areas.

Further, it is determined at predetermined time intervals (e.g., at intervals of one day) whether or not the user terminal 16 has travelled a distance greater than the first reference distance as described above, and if the user terminal 16 has travelled a distance greater than the first reference distance, the item ID communication section 94 receives gift data.

Further, irrespective of the determination made at the above time intervals, if the user terminal 16 has travelled a distance greater than the second reference distance, and even if the predetermined period of time (e.g., one day) has yet to elapse from when the determination was made previously as to whether or not to receive gift data, the item ID communication section 94 receives gift data.

Still further, for example, all the gift data received by the item ID communication section 94 need not be subject to the processes in S101 to S115. For example, each time the latest position coordinates are stored in the position coordinate storage section 82, the item management section 96 may verify whether or not gift data, correlated with the area ID of any one of the areas in a group of q×q areas (where q<p) identified by the position coordinates and including an area that in turn includes the position coordinates (e.g., at the center), is stored in the game record storage section 86. Then, the user terminal 16 may perform the processes in S101 to S115 on the gift data that has been verified to be stored in the game record storage section 86. As a result, in the present embodiment, the presence of gift data is detected according to whether or not the gift data, correlated with the area ID of any one of the areas in a group of q×q areas identified by and including the latest position coordinates is stored in the game record storage section 86. This makes it possible to detect whether or not there is any gift data near the user terminal 16 even if the user position management server 12 and the user terminal 16 cannot communicate with each other during the detection.

Further, for example, the user position management server 12 may store received title IDs, received item IDs, received position coordinates, received user IDs, and gift data including determined expiration dates. Then, upon receipt of position coordinates from the item ID communication section 94, the user position management server 12 may send, back to the user terminal 16, gift data including the position coordinates at a distance equal to or smaller than (or smaller than) a predetermined distance from the received position coordinates.

Still further, for example, the user position management server 12 may store, in advance, treasure data that includes area IDs, title IDs, item IDs, and so on. Then, the user terminal 16 may receive treasure data and perform the processes in S101 to S115 as is done with gift data in the above embodiment.

Still further, for example, gift data or treasure data may be correlated with data indicating a predetermined condition (e.g., items associated with gift data can be used only when a user identified by the user ID included in the gift data or treasure data is registered as a friend). Then, the user terminal 16 may, for example, determine, between the processes in S103 and S104, whether or not the condition correlated with the gift data or treasure data subject to the processes is satisfied. Then, if the condition is satisfied, the user terminal 16 may perform the process in S104. If not, the user terminal 16 may perform the process in S107.

Still further, for example, we assume that a game program identified by the title ID that is included in gift data or treasure data has yet to be installed in the user terminal 16 when the gift data or treasure data is enqueued into the discovered data queue Q1. However, if the game program is installed in the user terminal 16 later, data of an item identified by the item ID that is included in the gift data or treasure data may be used in the game program.

Still further, for example, the individual setting image 66 for a game program that is not installed in the user terminal 16 may be arranged in the automatic download setting image 64. Then, a game program that is not installed in the user terminal 16 may be set to the automatic download state in the user terminal 16 (the value of the install flag of the game program may be set to '1'). At this time, when the user terminal 16 receives, from the user position management server 12, gift data or treasure data correlated with the game program, data of the item associated with the gift data or treasure data is downloaded to the user terminal 16 from the information server 14 and stored in the item storage section 98 without waiting for a download permission from the user.

Still further, if gift data or treasure data is correlated with a game program that is not installed in the user terminal 16, and if data of an associated item is stored in the item storage section 98, a link to a shopping site that sells game programs may be arranged at the bottom left of the item detail image 74. Then, when the link is clicked, the user terminal 16 may display, on the touch screen 16a, the shopping site where the game program can be purchased.

Still further, if a predetermined event takes place when the application execution section 84 executes a game program, the application execution section 84 may display, on the touch screen 16a, an image adapted to inquire about whether or not to set items correlated with the game program to the automatic download state. This image has two buttons, one having a character string that says "Yes" and another having a character string that says "No." Then, when the user taps the button having a character string that says "Yes," the application execution section 84 may continue with the execution of the game program after the value of the install flag of the game program has been set to '1' by the item management section 96. This allows the user to make a setting so that items correlated with a game program are downloaded to the user terminal 16 without waiting for a download permission from the user, and this can be achieved without interrupting the user from having an immersive experience in the game.

It should be noted that when the user taps the button having a character string that says "Yes" that is arranged in the image adapted to inquire about whether or not to select the automatic download state, the application execution section 84 may interrupt the execution of the game program. Then, the input/output control section 90 may display the automatic download setting image 64, shown in FIG. 8, on the touch screen 16a. As a result, it is possible to make a setting so that items correlated with a game program are downloaded to the user terminal 16 without waiting for a download permission from the user via the automatic download setting image 64 even during the execution of the game program.

It should be noted that the program including the instruction associated with the application execution section 84 shown in FIG. 13 and the program (e.g., position management program) including the instructions associated with the sections other than the application execution section 84 shown in FIG. 13 may be different. Then, if the position management program according to the present embodiment is not active when the user taps the button having a character string that says "Yes," the user terminal 16 may start up the position management program according to the present embodiment first, followed by the display of the automatic download setting image 64 on the touch screen 16a by the input/output control section 90. At this time, the input/output control section 90 may display, on the touch screen 16a, the automatic download setting image 64 in which the automatic download checkbox CB2 for the game program that was executed by the application execution section 84 is checked. When the value of the install flag for the game program is set to '1' later, the user terminal 16 may terminate the position management program according to the present embodiment, followed by the resumption of execution of the game program by the application execution section 84.

Further, for example, the degree of affinity may be calculated based on the own user ID and the user ID included in the gift data so that the user terminal 16 performs the processes in S101 to S115 only when the degree of affinity is equal to or greater than a given level. Here, the degree of affinity may be calculated based on information (e.g., sex, age group, owned game titles, and content genre) correlated with the user ID that can be received from the information server 14. More specifically, for example, the degree of affinity may be higher when the sex (or age group) of the user himself or herself matches the sex (or age group) of the user correlated with the user ID included in the gift data than when it does not. Still further, for example, the greater the numbers of games owned by the user himself or herself and by the user correlated with the user ID included in the gift data, the higher the degree of affinity may be.

Still further, for example, the processes in S101 to S115 may be performed only for an item identified by the item ID that is included in gift data that includes the user ID of a user registered as a friend.

On the other hand, the above specific character strings and numbers and the specific character strings in the drawings are illustrative, and the present invention is not limited thereto.

The invention claimed is:

1. An information processing device comprising:
a geographic positioning system (GPS) sensor; and
a processor, the processor causing the information processing device to execute a computer program performing steps comprising:
storing, using the processor, a location of the information processing device every preset period of time;
allowing a user to set, via an input screen, a download setting for each of a plurality of video game programs,
wherein a separate download setting is stored for each of the plurality of video game programs, and
wherein selection of the download setting allows for automatic downloading of items associated with each of the video game programs,
periodically transmitting a location of the information processing device of a server from the GPS sensor, and,
downloading, for each of the plurality of programs having the download setting selected, items having a location within a predetermined distance of the location of the information processing device; and
storing the download items in association with each of the plurality of video game programs,
wherein the download items are gifts items or treasure items for use in the video game program they are stored with,
wherein, if an item is available within the predetermined range for a first video game program, and the download setting is not selected for the first video game program, execution of the first video game program is interrupted mid-execution to display a download screen to allow the user to download the item available within the predetermined range, and
wherein if the item available within the predetermined range for the first video game program is downloaded, execution of the first video game program is resumed after downloading, and
wherein the items are downloaded according to a random probability determination.

2. The information processing device according to claim 1, wherein each stored item is associated with an expiration date, and expired items are deleted after the expiration date.

3. A non-transitory computer readable medium having stored thereon a computer program, the computer program causing an information processing device to execute steps of:

allowing a user to set, via an input screen, a download setting for each of a plurality of video game programs, wherein a separate download setting is stored for each of the plurality of video game programs, and wherein selection of the download setting allows for automatic downloading of items associate with each of the video game programs;

downloading items for each of the plurality of video game programs having the download setting selected; and storing the downloaded items in association with each of the plurality of video game programs, wherein the downloaded items are gift items or treasure items for use in the video game program they are stored with, wherein, if the download setting is not selected for a first video game program, execution of the first video game program is interrupted mid-execution to display a download screen to allow the user to download the item, and wherein if the item is downloaded, execution of the first video game program is resumed after downloading, and wherein the items are downloaded according to a random probability determination.

4. The information processing according to claim 3, wherein each stored item is associated with an expiration date, and expired items are deleted after the expiration date.

* * * * *